(12) United States Patent
Lee et al.

(10) Patent No.: US 11,385,077 B2
(45) Date of Patent: Jul. 12, 2022

(54) SENSING DEVICE

(71) Applicant: LG INNOTEK CO., LTD., Seoul (KR)

(72) Inventors: Chang Hwan Lee, Seoul (KR); Sung Wook Byun, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 207 days.

(21) Appl. No.: 16/954,379

(22) PCT Filed: Nov. 12, 2018

(86) PCT No.: PCT/KR2018/013683
§ 371 (c)(1),
(2) Date: Jun. 16, 2020

(87) PCT Pub. No.: WO2019/135485
PCT Pub. Date: Jul. 11, 2019

(65) Prior Publication Data
US 2021/0080288 A1 Mar. 18, 2021

(30) Foreign Application Priority Data

Jan. 4, 2018 (KR) .................. 10-2018-0001209
May 30, 2018 (KR) .................. 10-2018-0061898

(51) Int. Cl.
*G01D 5/14* (2006.01)
*B65D 5/04* (2006.01)
*B62D 5/04* (2006.01)

(52) U.S. Cl.
CPC .......... *G01D 5/145* (2013.01); *B62D 5/0487* (2013.01)

(58) Field of Classification Search
CPC ....................................................... B62D 6/10
See application file for complete search history.

(56) References Cited

U.S. PATENT DOCUMENTS

| 2012/0297916 A1 | 11/2012 | Lee |
| 2015/0090051 A1 | 4/2015 | Lee |
| 2019/0301954 A1* | 10/2019 | Lee .................. B62D 15/0215 |

FOREIGN PATENT DOCUMENTS

| CN | 104515635 A | 4/2015 |
| EP | 2 860 504 A1 | 4/2015 |
| KR | 10-2011-0008508 A | 1/2011 |
| KR | 10-2011-0109100 A | 10/2011 |

(Continued)

*Primary Examiner* — Noam Reisner
(74) *Attorney, Agent, or Firm* — Birch, Stewart, Kolasch & Birch, LLP

(57) ABSTRACT

An embodiment provides a sensing device comprising: a first cover; a second cover coupled with the first cover; a rotor disposed at the second cover; a first magnet disposed between the second cover and the rotor; a stator disposed between the first magnet and the second cover; a seating part disposed between the first cover and the rotor; a second magnet disposed on the seating part; a circuit board disposed on a bottom surface of the second cover; and a first hall sensor and a second hall sensor disposed on the circuit board, wherein the first cover comprises an upper plate having an opening and a side plate extending downward from the upper plate, and the side plate of the first cover comprises a first groove formed at a position corresponding to the second hall sensor and a second groove spaced apart from the first groove.

12 Claims, 33 Drawing Sheets

(56) References Cited

FOREIGN PATENT DOCUMENTS

| KR | 10-2014-0002155 A | 1/2014 |
| KR | 10-2015-0034982 A | 4/2015 |
| KR | 10-2015-0082920 A | 7/2015 |
| KR | 10-1633127 B1 | 6/2016 |
| KR | 10-2017-0092509 A | 8/2017 |
| KR | 10-1800769 B1 | 11/2017 |

* cited by examiner

[FIG. 1]
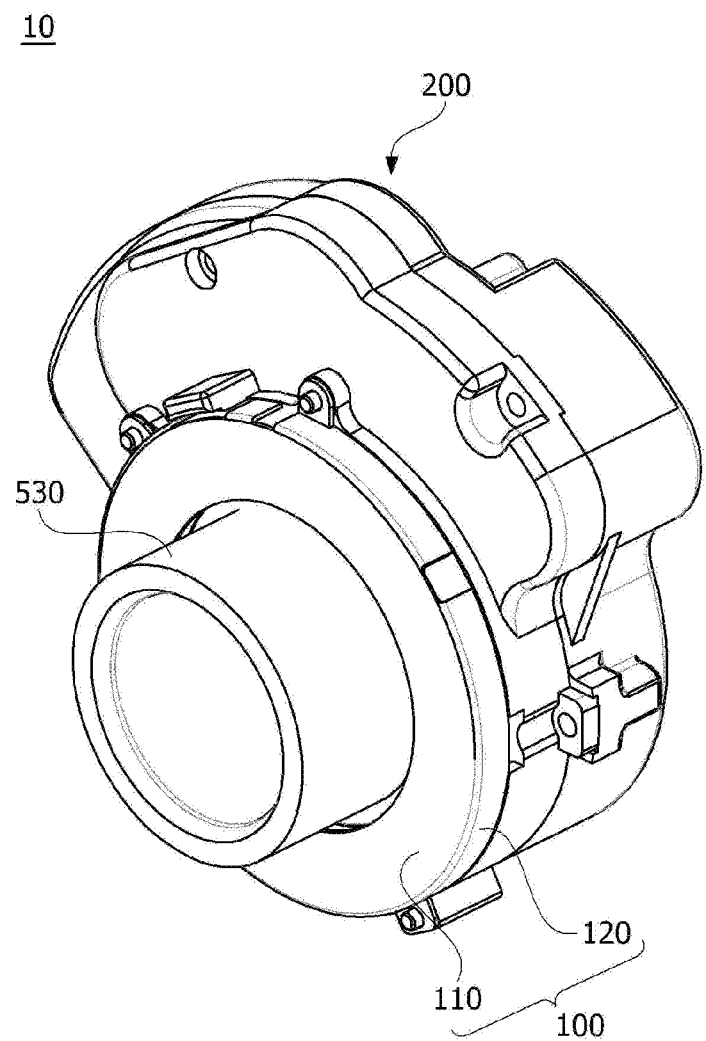

[FIG. 2]
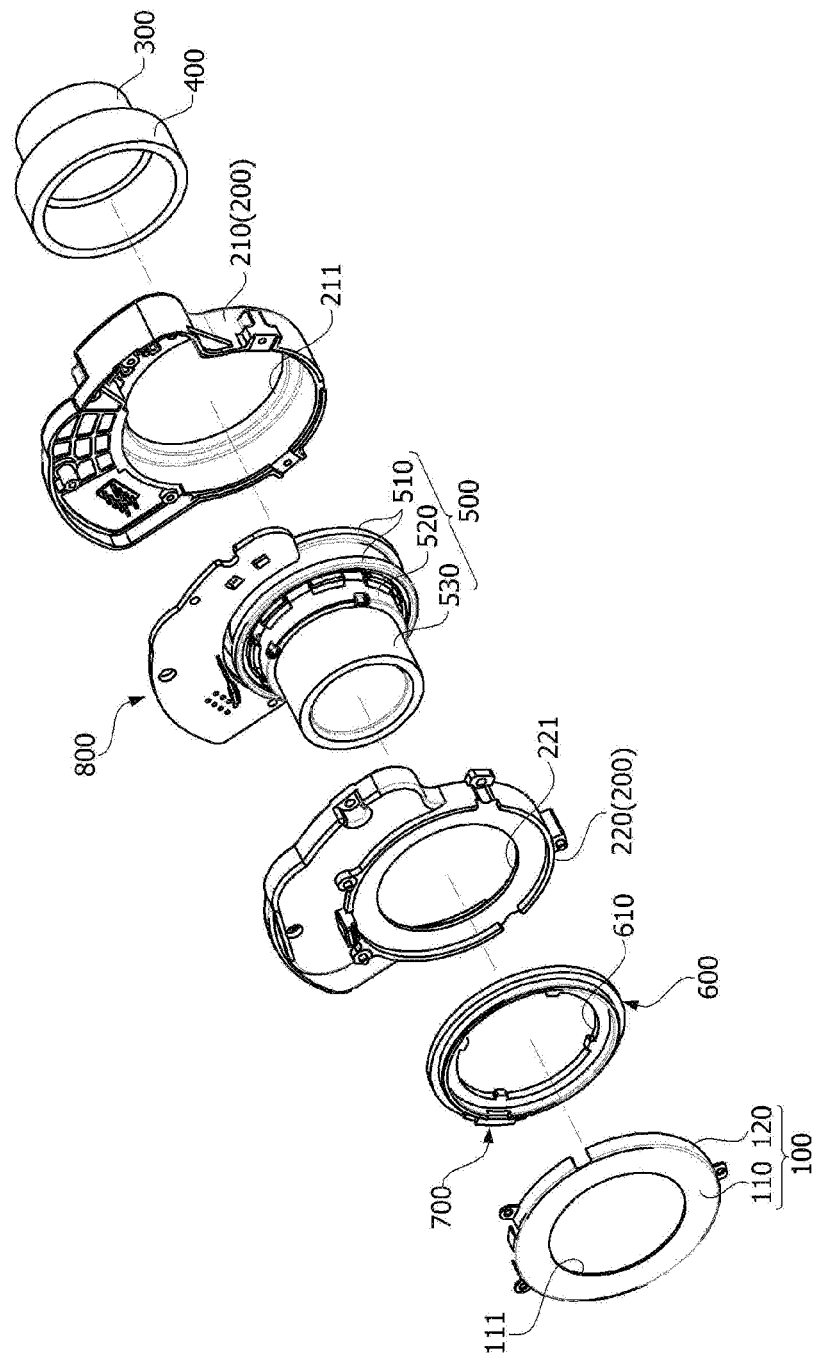

[FIG. 3]
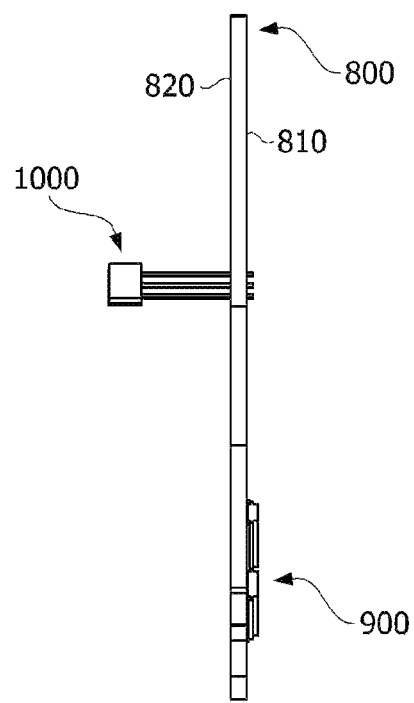

[FIG. 4]
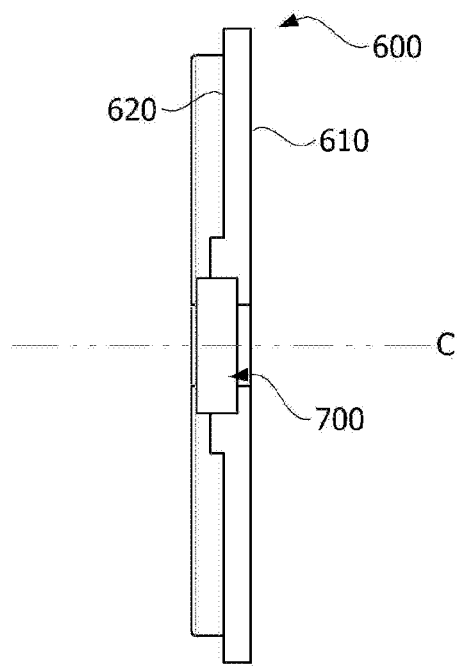
[FIG. 5]
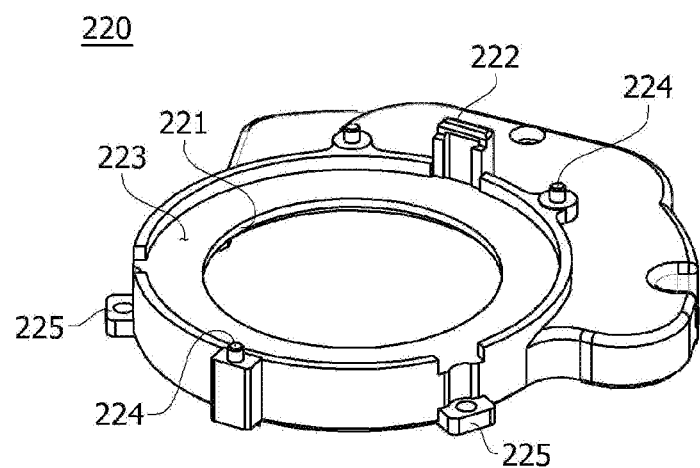

[FIG. 6]
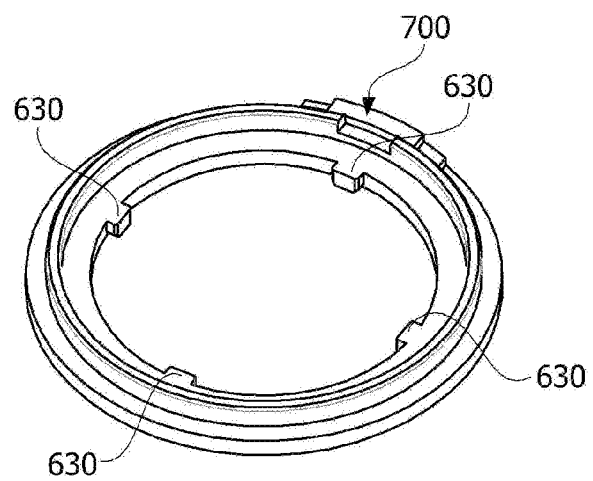

[FIG. 7]
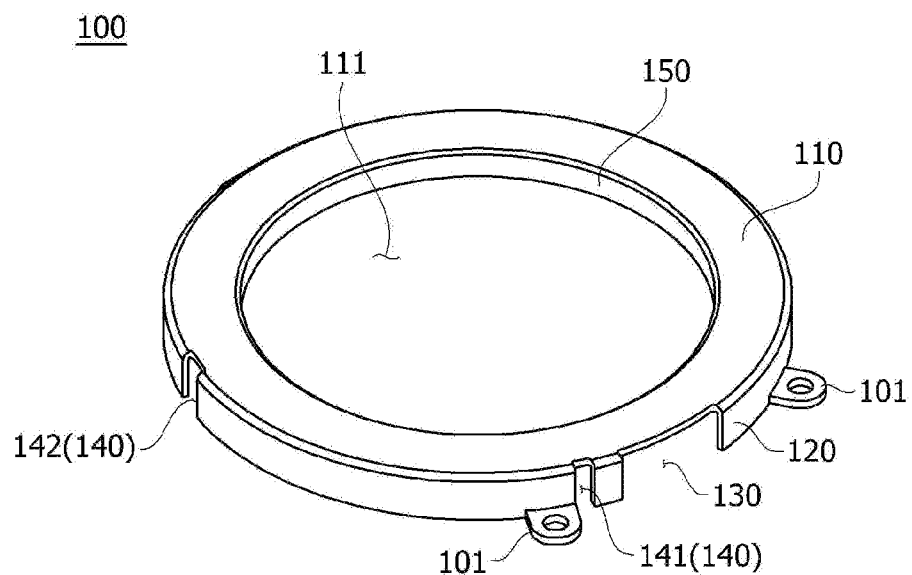
[FIG. 8]
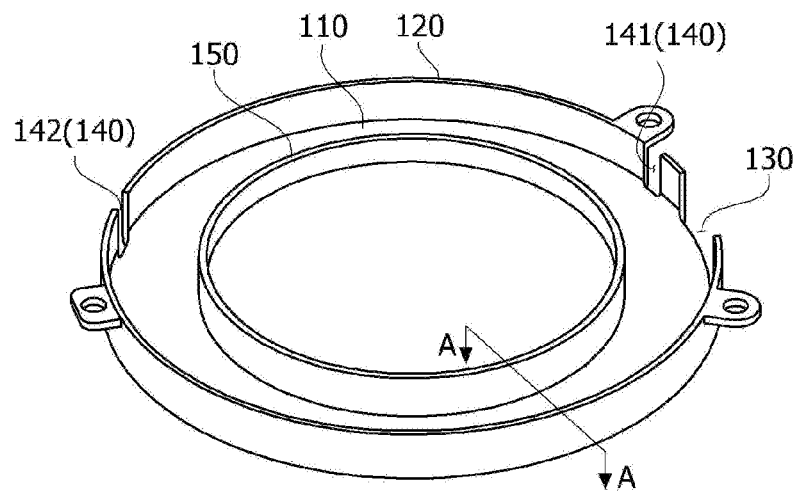

[FIG. 9]
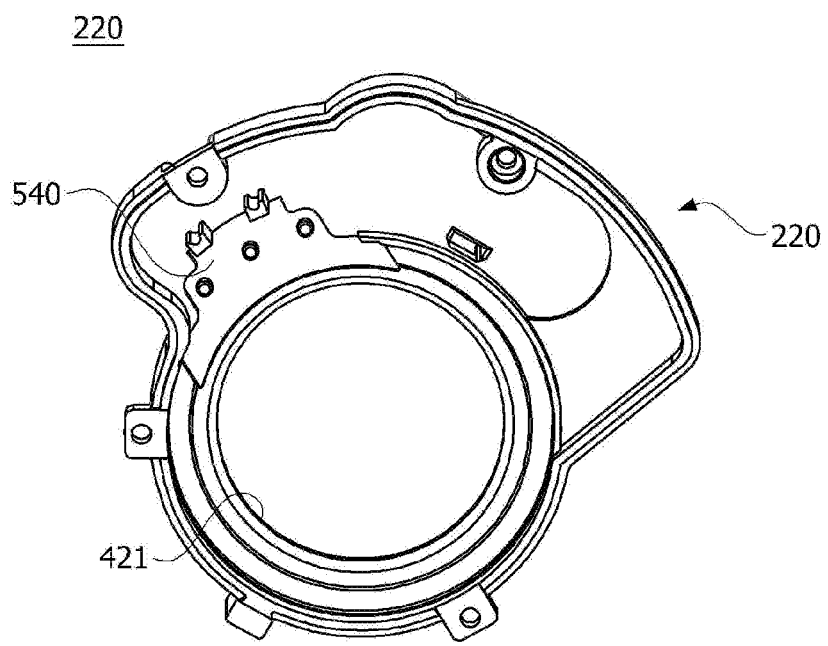

[FIG. 10]
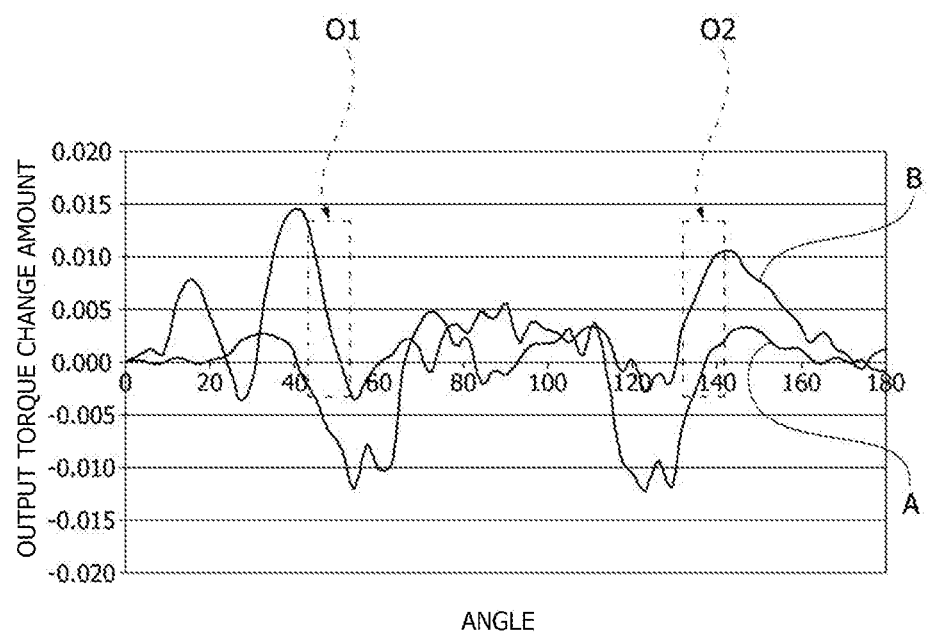

[FIG. 11]
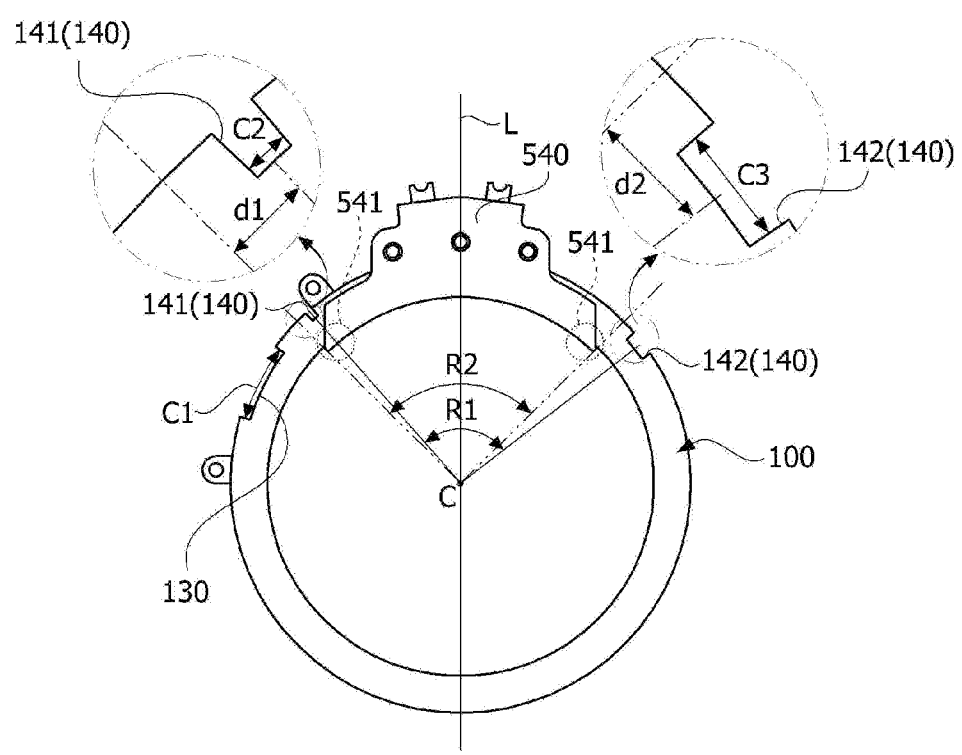

[FIG. 12]
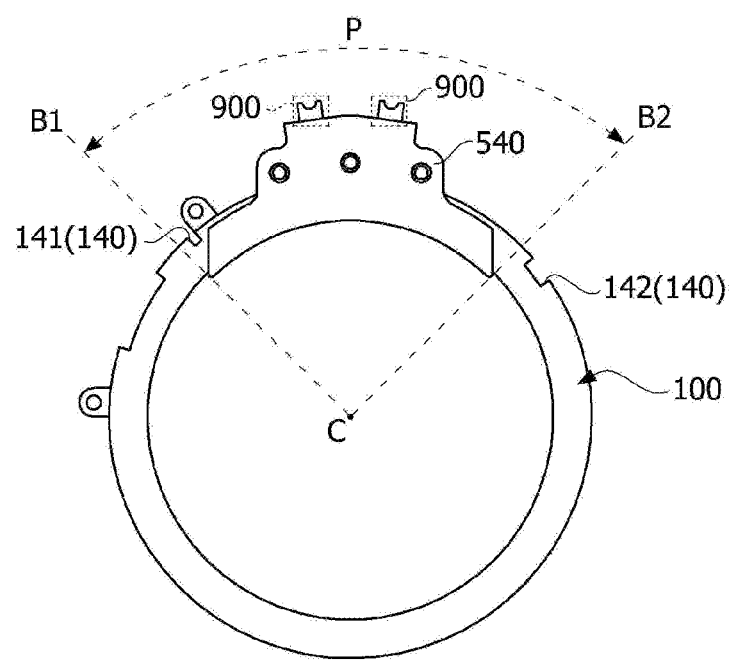

[FIG. 13]
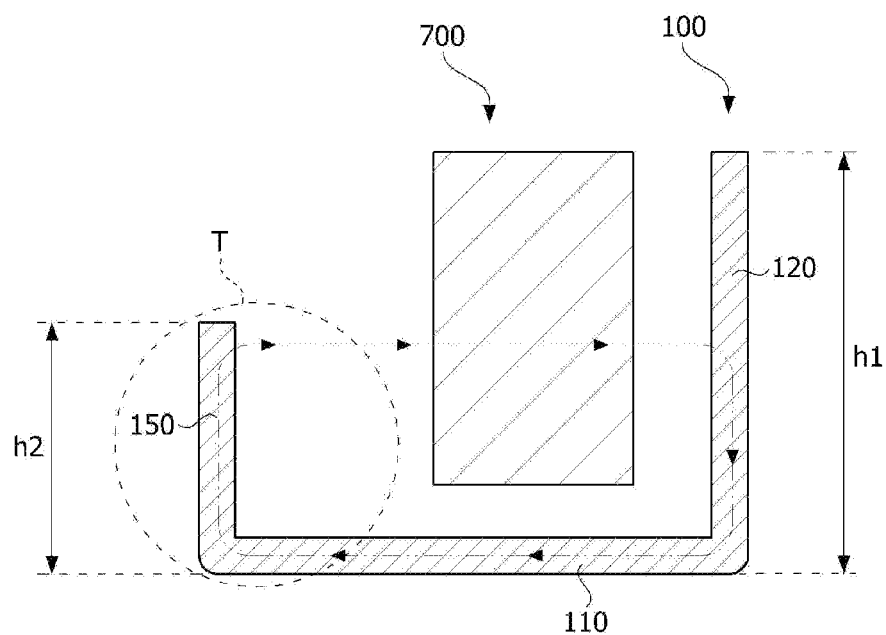

[FIG. 14]
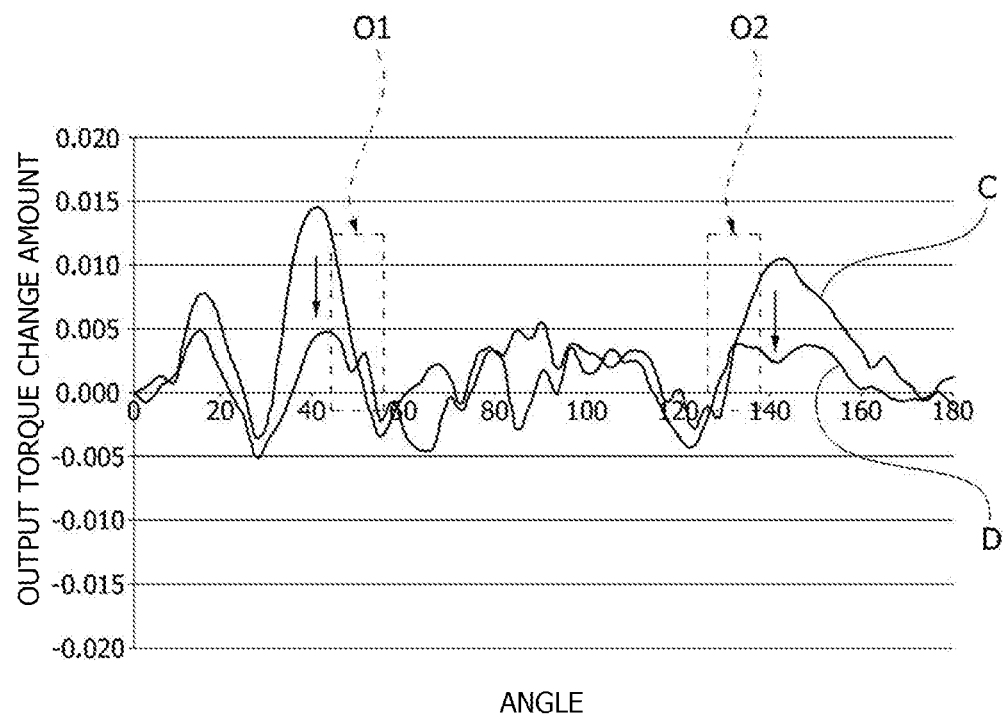

[FIG. 15]
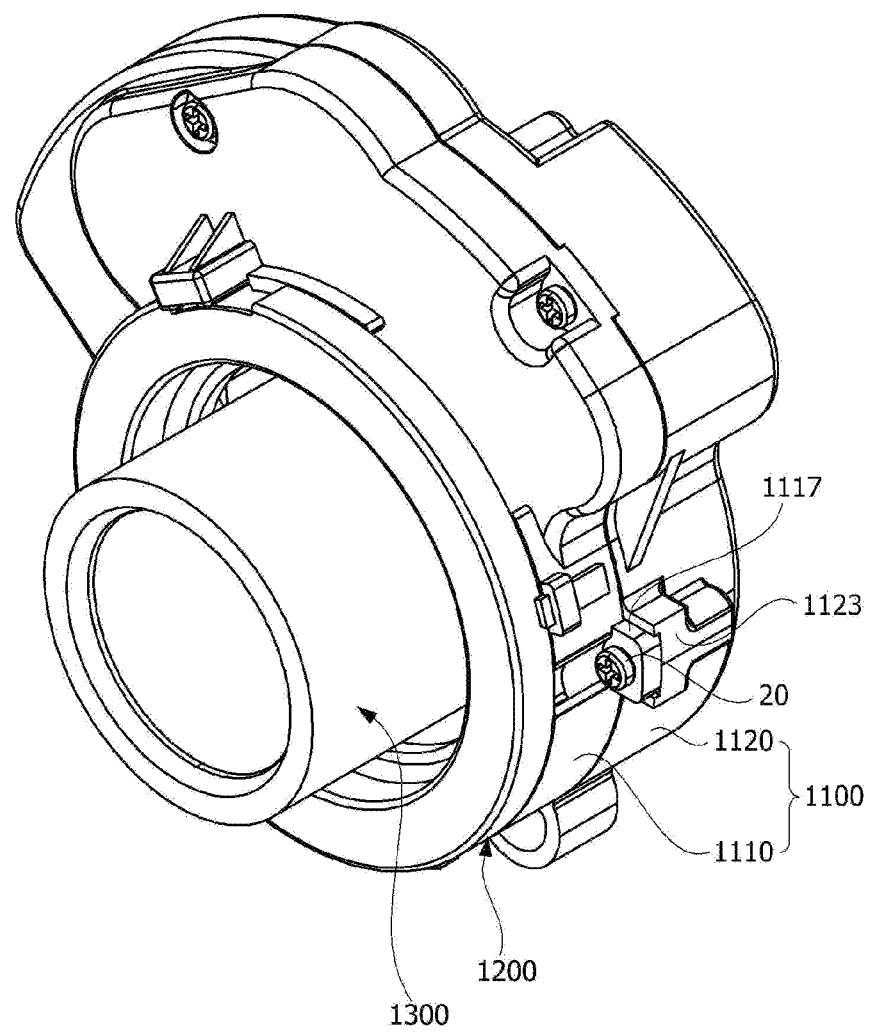

[FIG. 16]
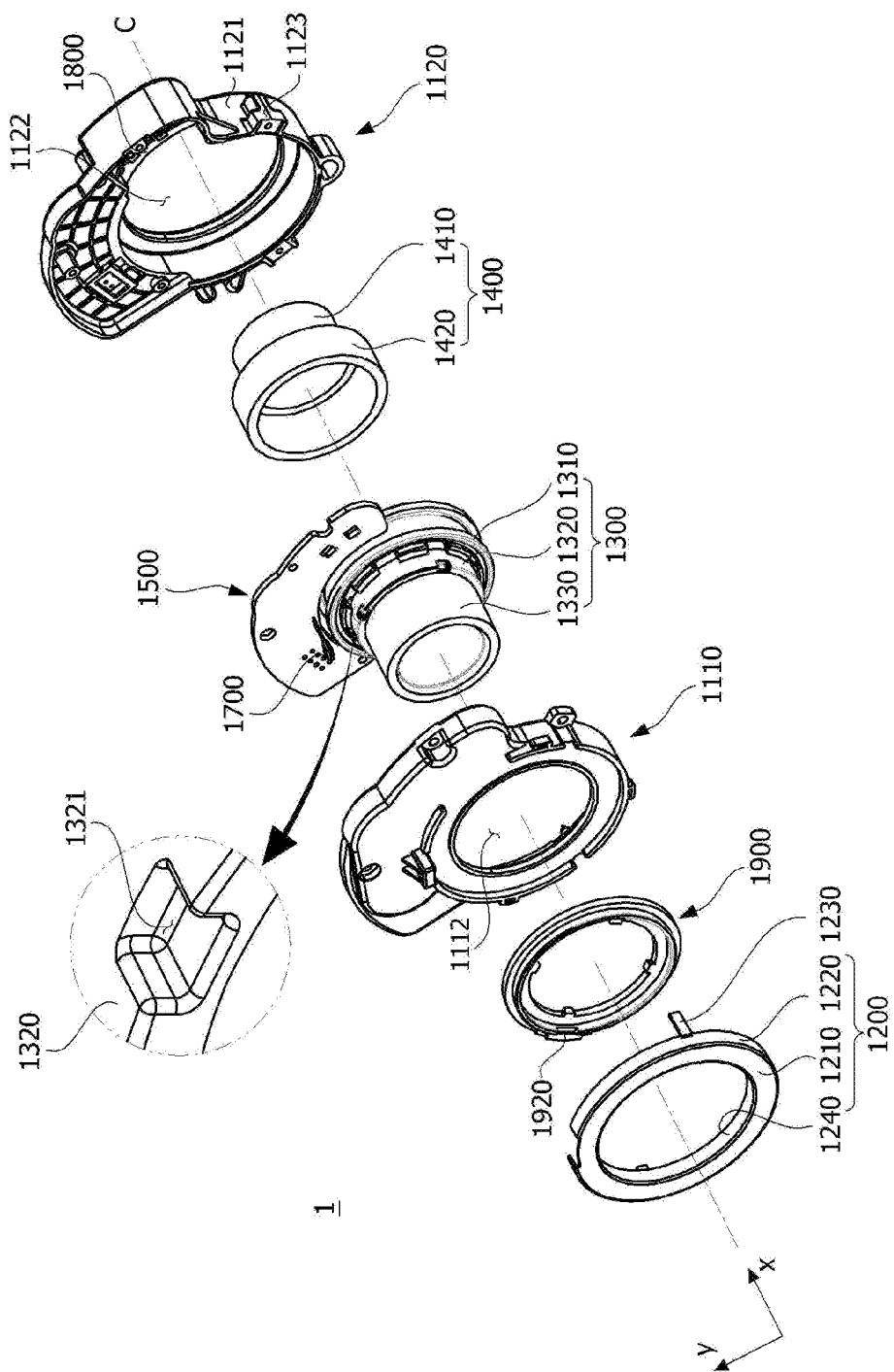

[FIG. 17]
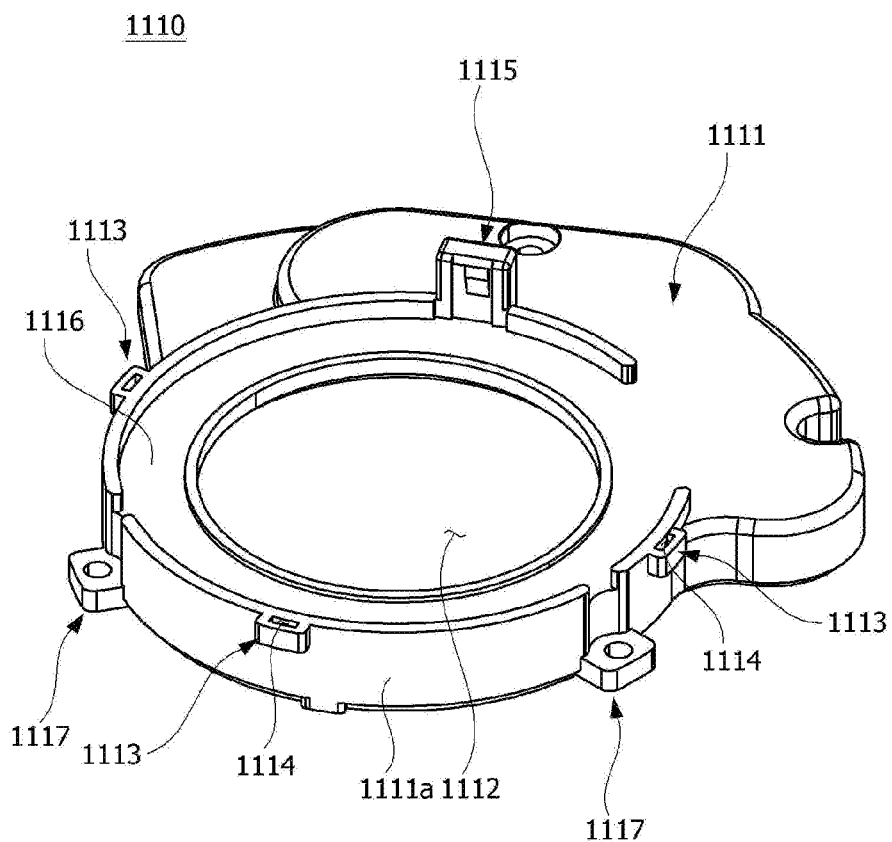

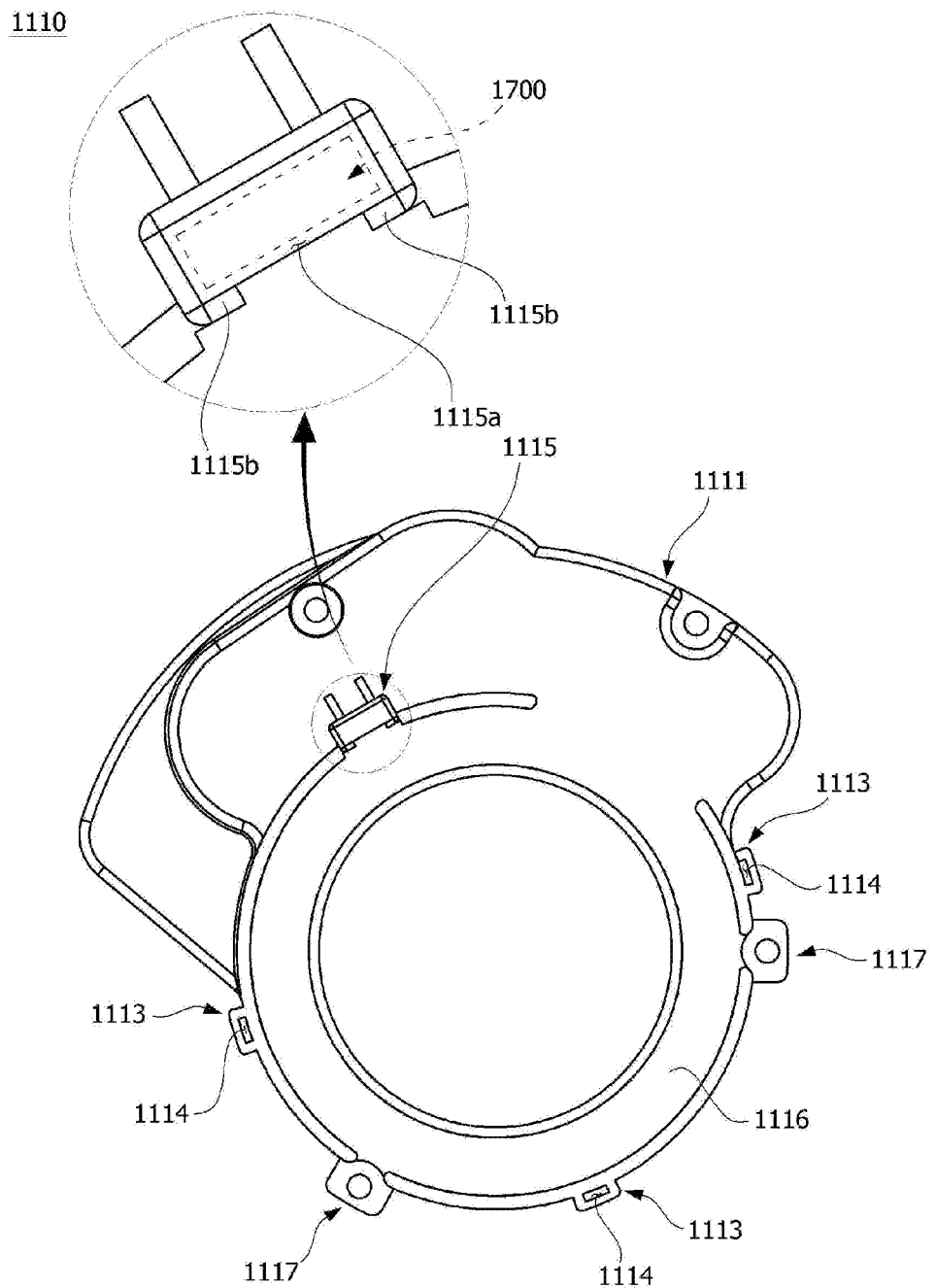
[FIG. 18]

[FIG. 19]
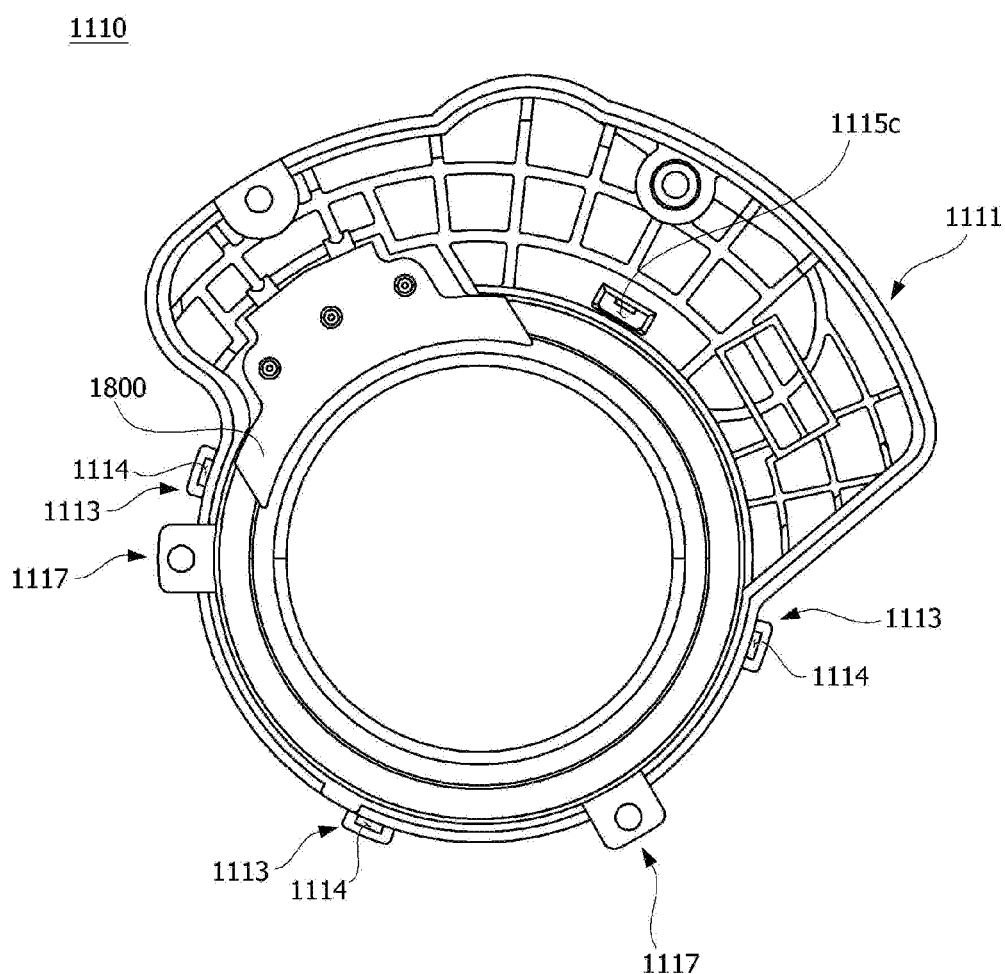

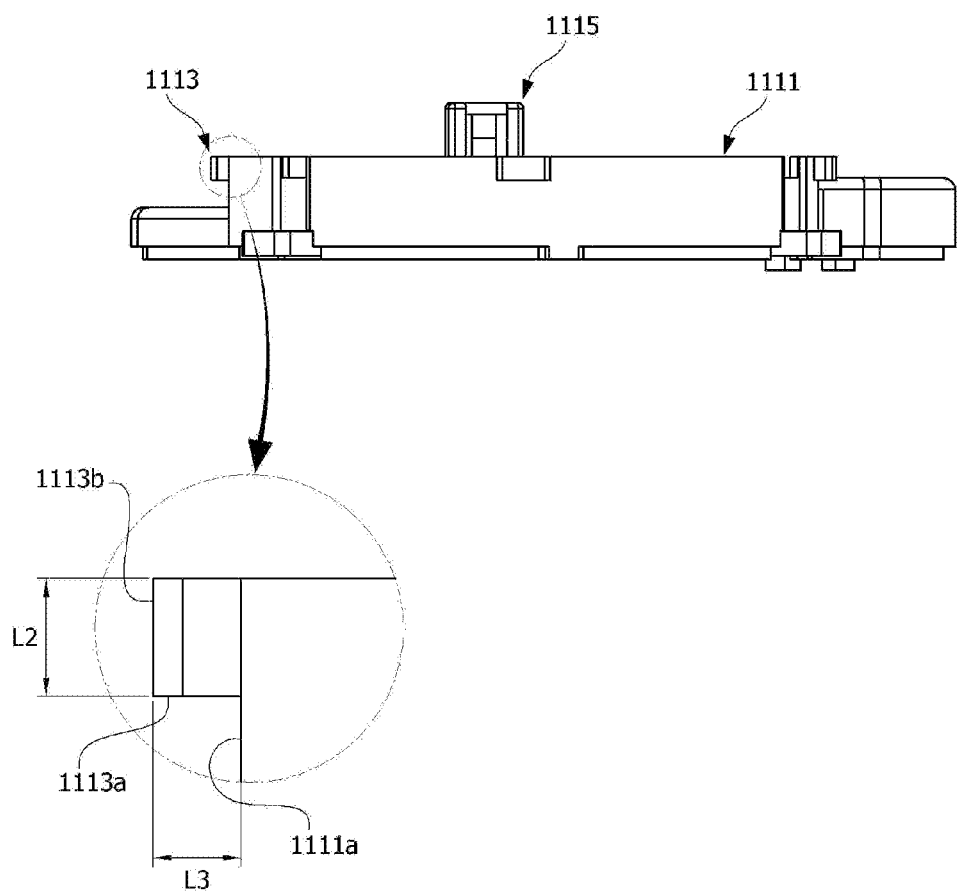
[FIG. 20]

[FIG. 21]
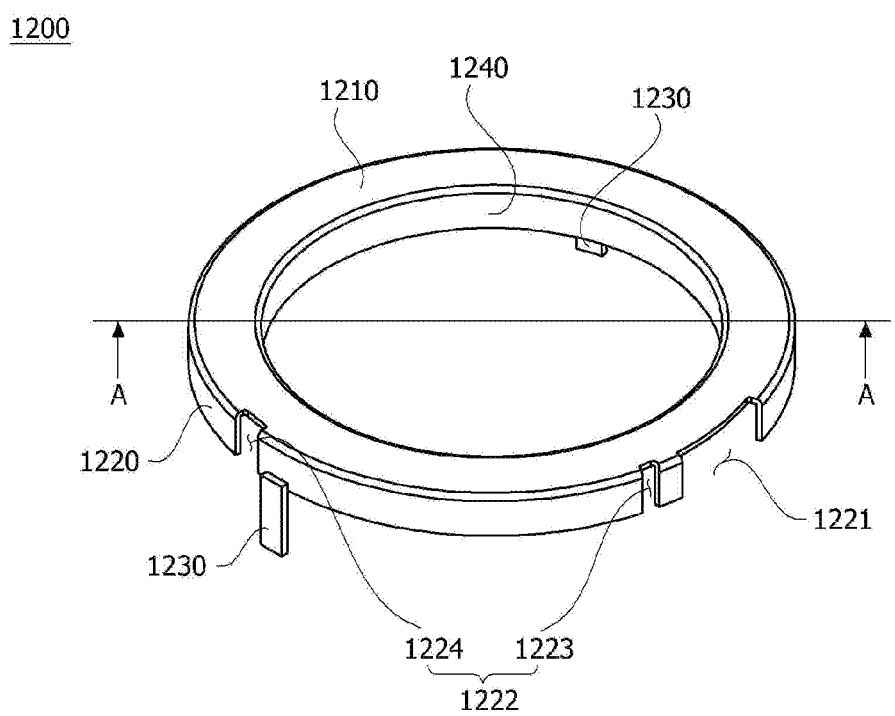

[FIG. 22]
1200
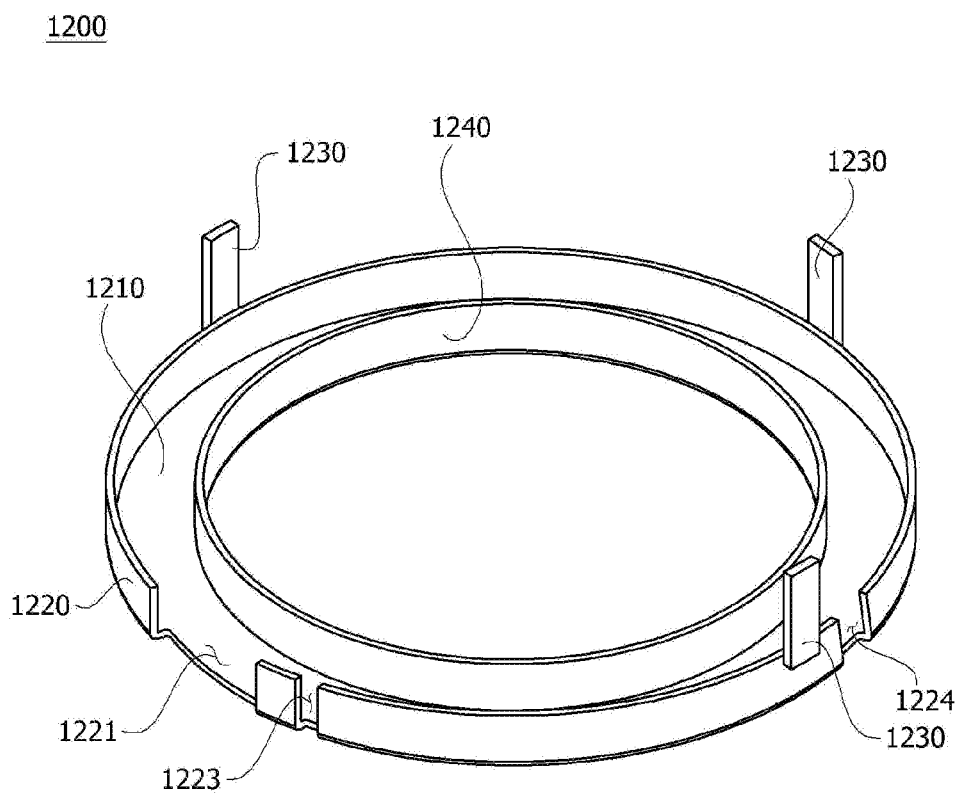

[FIG. 23]
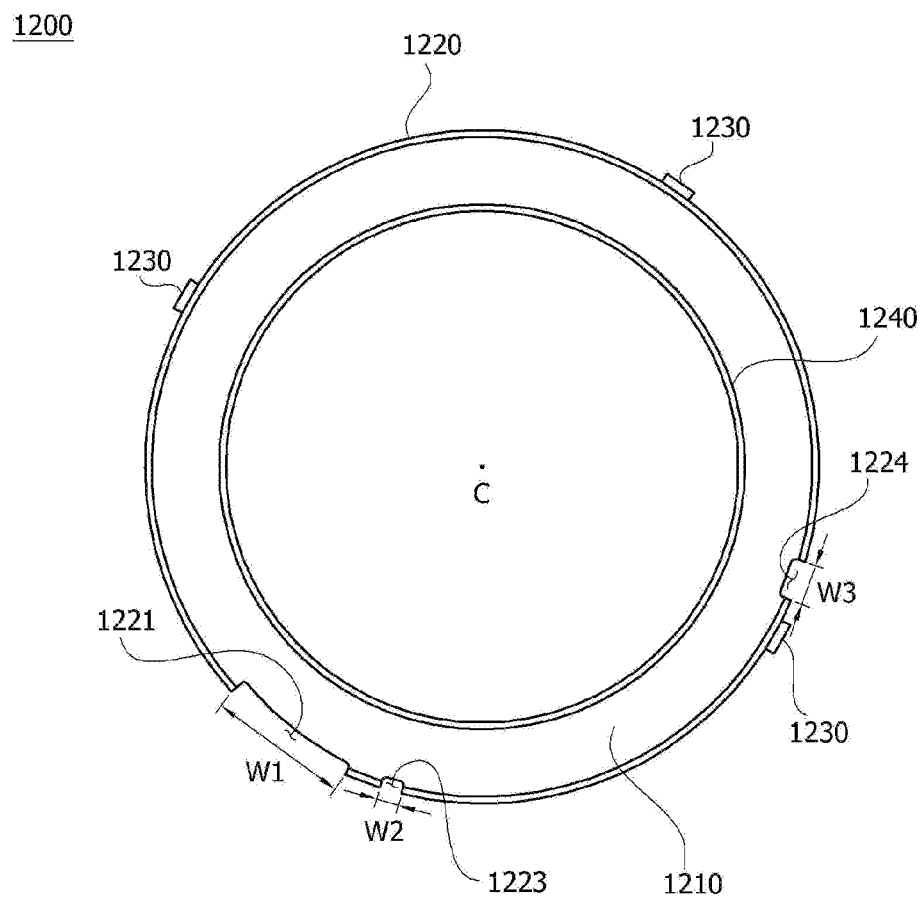

[FIG. 24]
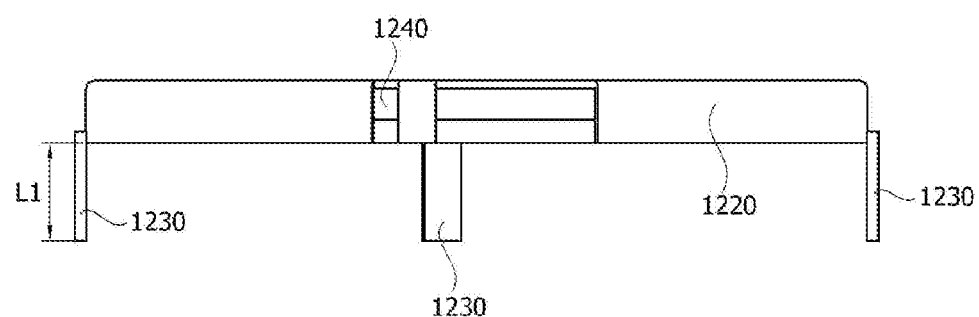

[FIG. 25]
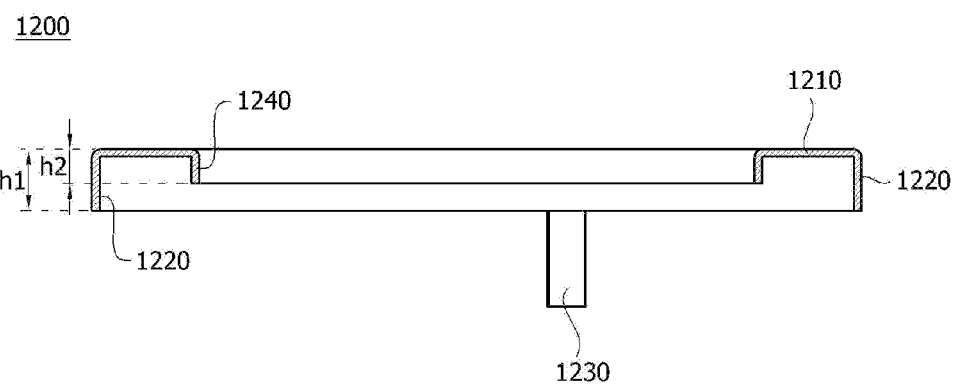

[FIG. 26]
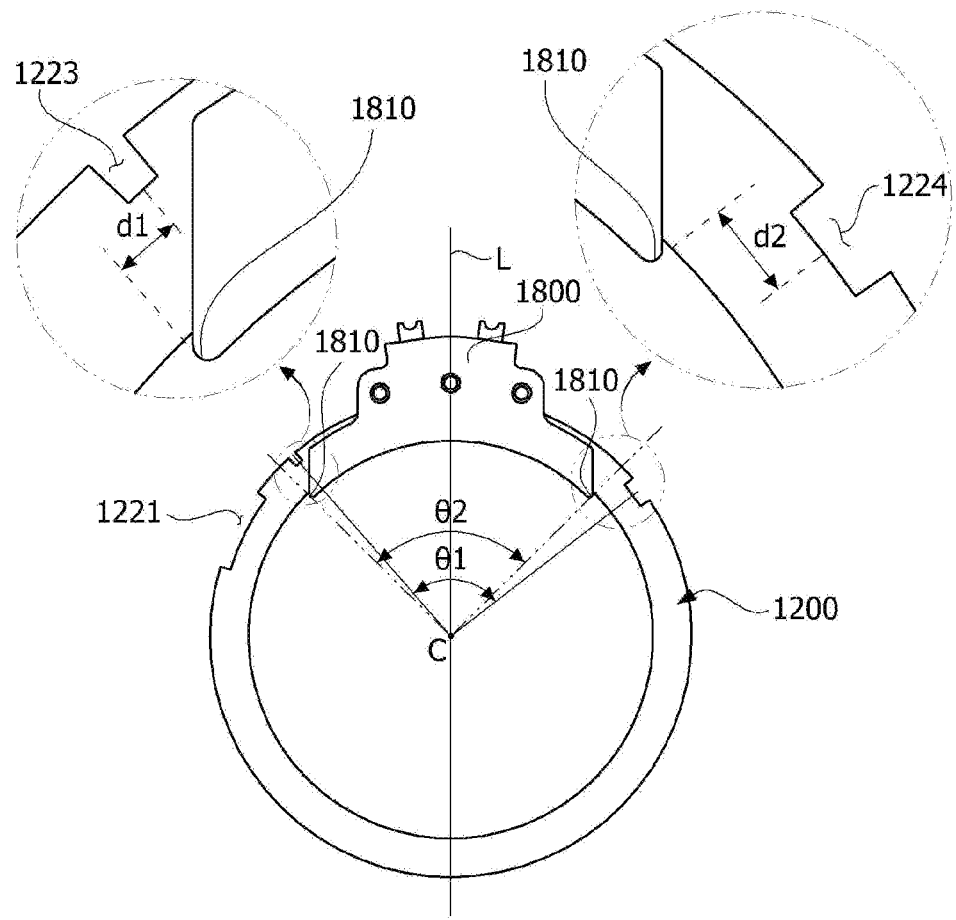

[FIG. 27]
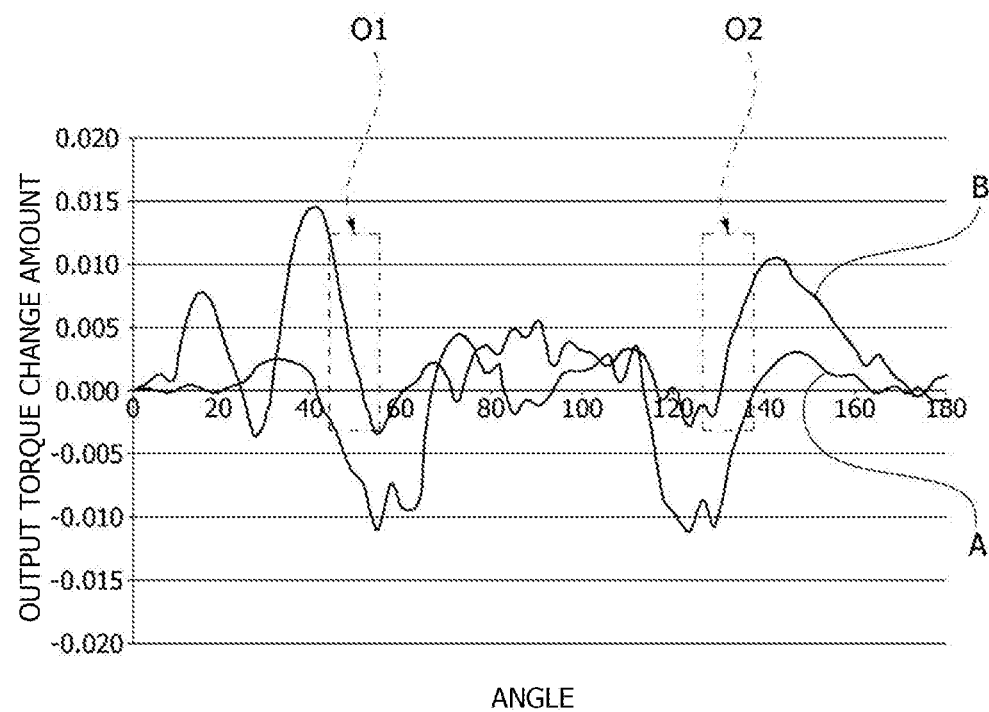

[FIG. 28]
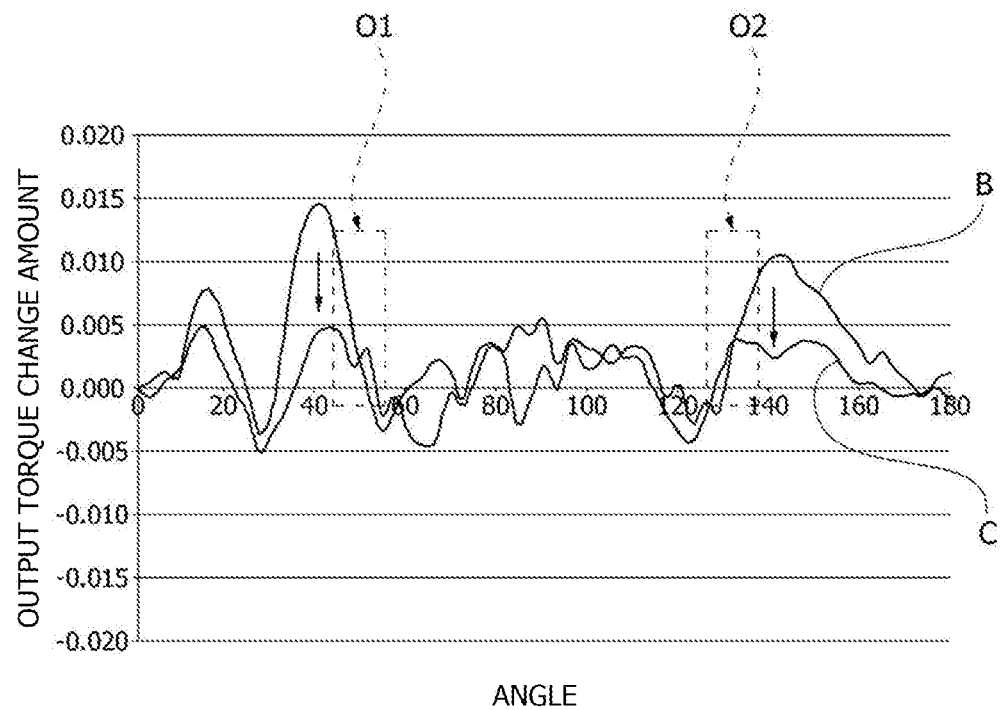

[FIG. 29]
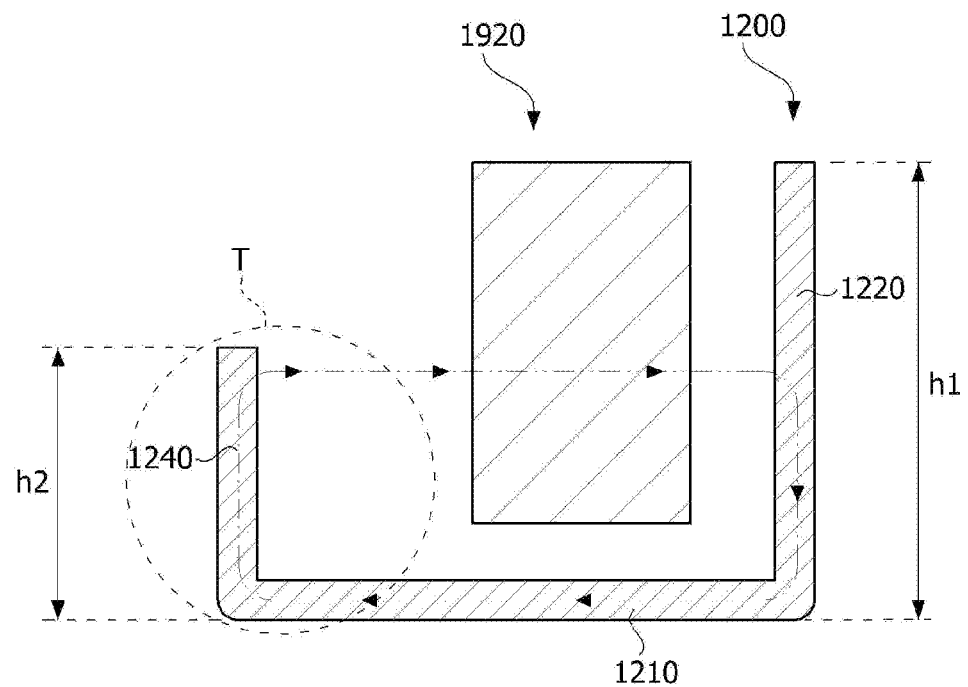

[FIG. 30]
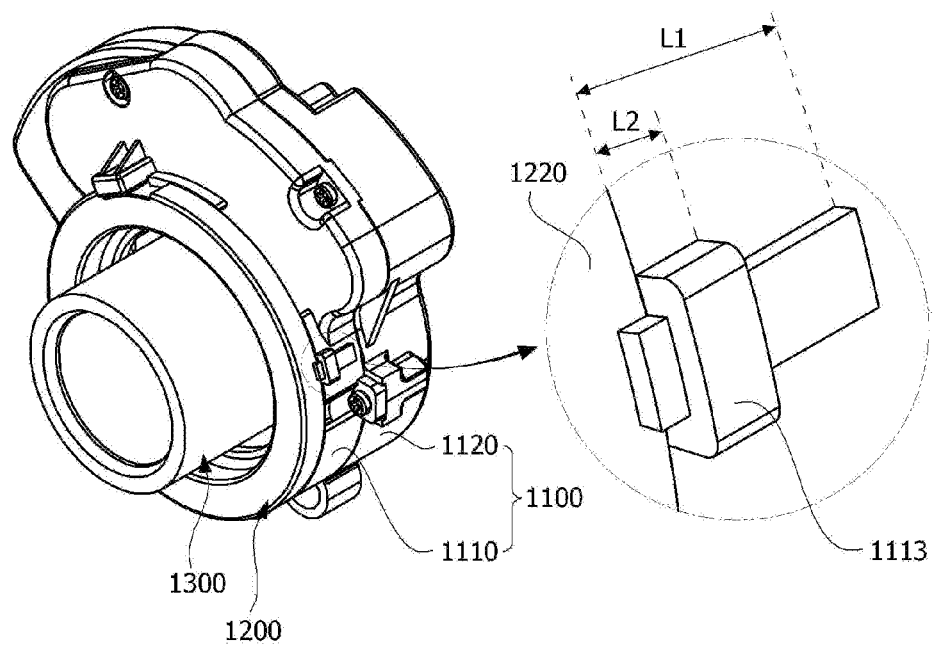

[FIG. 31]
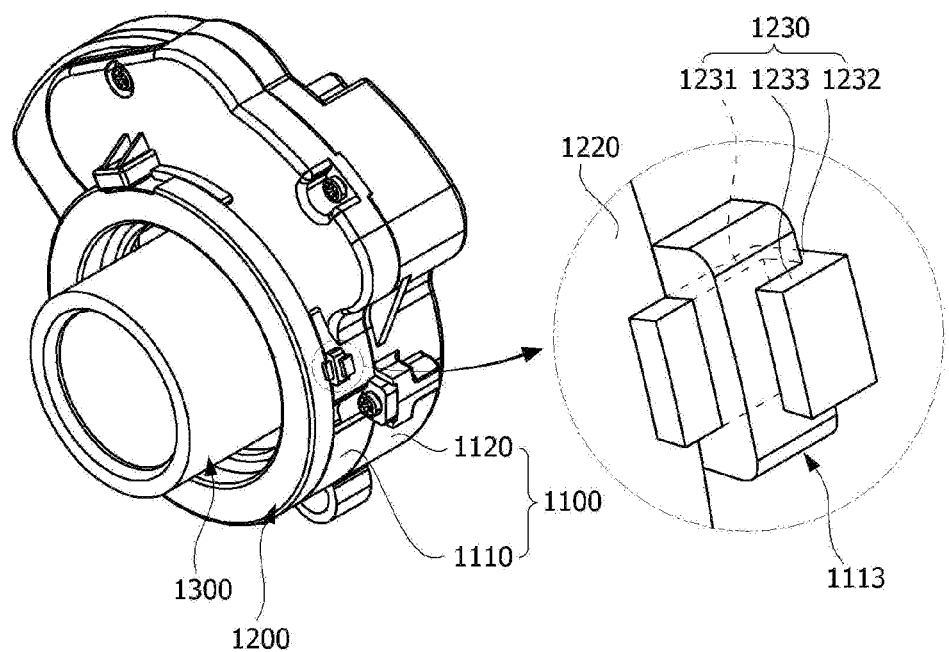

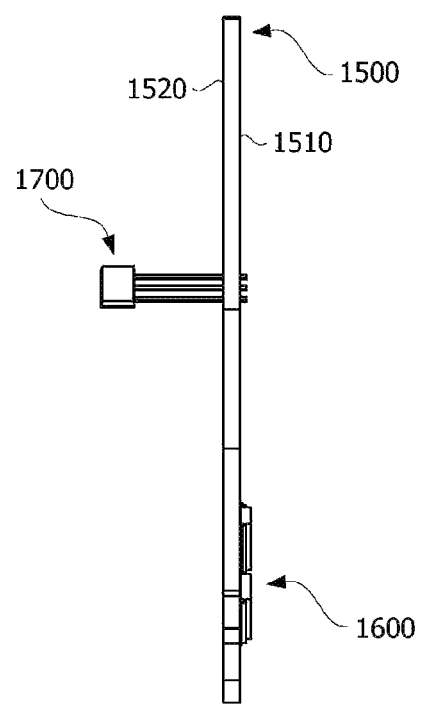
[FIG. 32]

[FIG. 33]
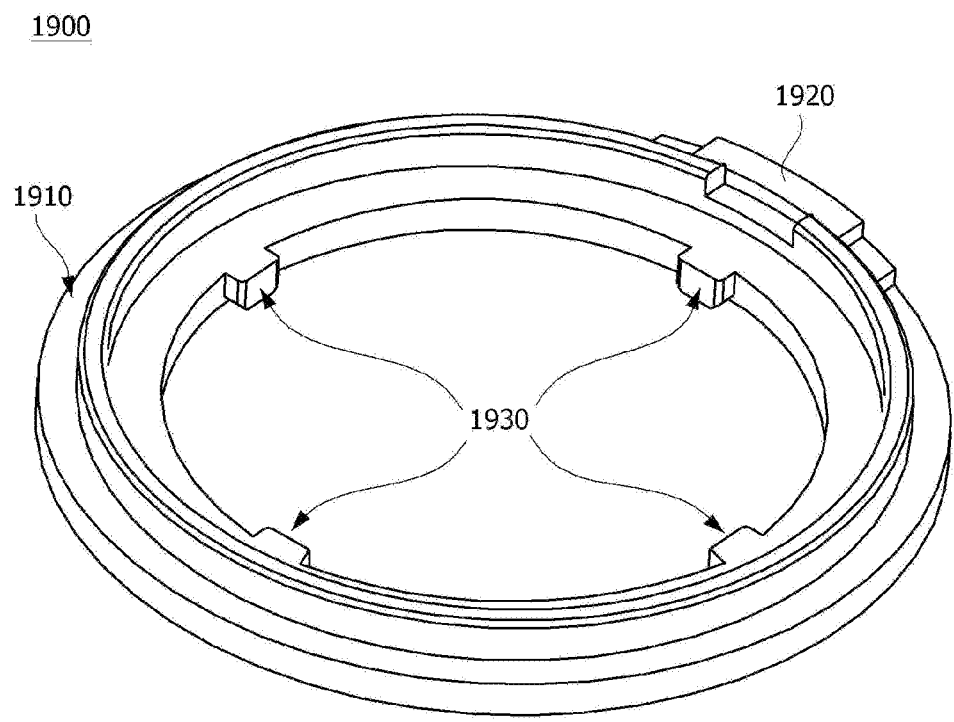

[FIG. 34]
1900
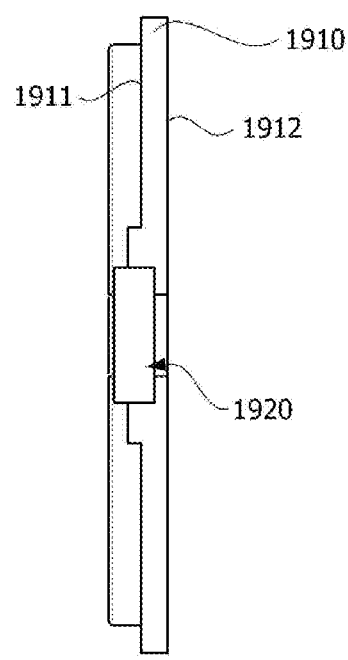

[FIG. 35]
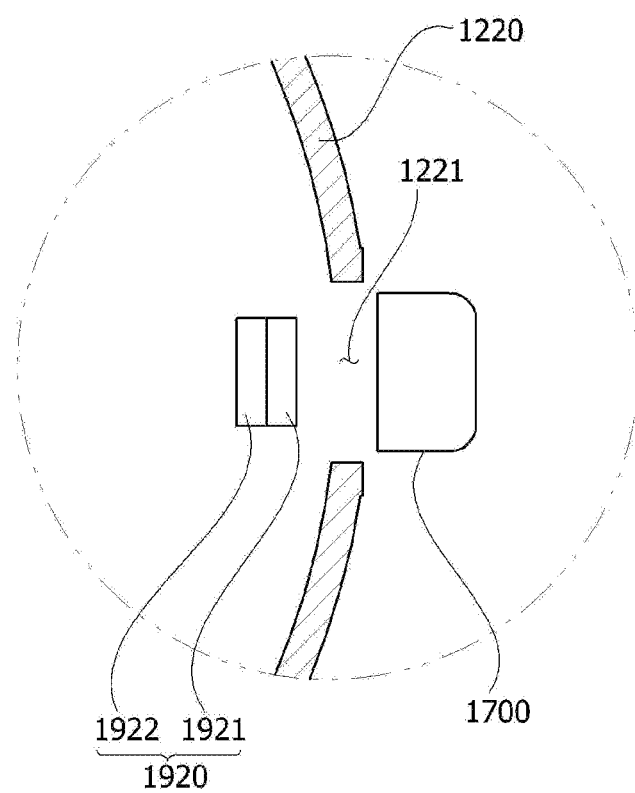

SENSING DEVICE

CROSS REFERENCE TO RELATED APPLICATIONS

This application is the National Phase of PCT/KR2018/013683 filed on Nov. 12, 2018, which claims priority under 35 U.S.C. § 119(a) to Patent Application Nos. 10-2018-0001209 and 10-2018-0061898 filed in the Republic of Korea on Jan. 4, 2018 and May 30, 2018, respectively, all of which are hereby expressly incorporated by reference into the present application.

TECHNICAL FIELD

The present invention relates to a sensing device.

BACKGROUND ART

In an electronic power steering (EPS) system, an electronic control unit drives a motor according to driving conditions to secure turning stability and provide quick reinforcing force so that a driver can stably travel.

An EPS system includes a sensor assembly configured to measure a torque, a steering angle, and the like of a steering shaft to provide a proper torque. The sensor assembly may include a torque sensor configured to measure a torque applied to the steering shaft and an index sensor configured to measure an angular acceleration of the steering shaft. In addition, the steering shaft may include an input shaft connected to a handle, an output shaft connected to a power transmission structure at a side of a wheel, and a torsion bar which connects the input shaft and the output shaft.

The torque sensor measures a torsion degree of the torsion bar to measure a torque applied to the steering shaft. In addition, the index sensor detects rotation of the output shaft to measure an angular acceleration of the steering shaft. In the sensor assembly, the torque sensor and the index sensor may be disposed to be integrally formed.

However, in such a sensor assembly, magnetic field interference occurs between the torque sensor and the index sensor. Accordingly, a cover is formed of a ferromagnetic substance in order to prevent the magnetic field interference. However, in the case in which the cover is formed of the ferromagnetic substance, there is a problem of an adverse effect to motor performance because a flux flows to the cover.

Particularly, in the case of the index sensor, a case may be used for an index function. In this case, the case may be fixed to a housing formed of a synthetic resin material such as plastic using a heat fusion method.

However, the case fixed to the housing using the heat fusion method may be easily damaged by an external impact and the like. Accordingly, the case has a problem of being separated from the housing.

Accordingly, a method may also be used in which the case is fixed to the housing using a fixing member such as a screw, but there is a problem of reducing productivity because additional components are used and a cost and a process are added.

Accordingly, there is a requirement for a coupling structure of a case and a housing allowing productivity to be improved and a fixing force is also secured.

In addition, there is a requirement for a case allowing magnetic field interference, which may occur between a torque sensor and an index sensor, to be prevented.

Technical Problem

The present invention is directed to providing a sensing device which secures performance of a motor even when a ferromagnetic substance is used for a cover to prevent magnetic field interference.

The present invention is directed to providing a sensing device allowing a case and a housing to be stably assembled without an additional component.

Particularly, the present invention is directed to providing a sensing device allowing a fixing force to be secured between a case formed of a metal material and a housing formed of a synthetic resin material.

In addition, the present invention is directed to providing a sensing device allowing magnetic field interference to be prevented even when a case formed of a metal material is used.

Objectives that should be solved according to embodiments are not limited to the above described objectives, and other objectives which are not described above will be clearly understood by those skilled in the art from the following specification.

Technical Solution

One aspect of the present invention provides a sensing device including a first cover, a second cover coupled to the first cover, a rotor disposed inside the second cover, a first magnet disposed between the second cover and the rotor, a stator disposed between the first magnet and the second cover, a seating part disposed between the first cover and the rotor, a second magnet disposed on the seating part, a circuit board disposed on a bottom surface of the second cover, and a first Hall sensor and a second Hall sensor disposed on the circuit board, wherein the first cover includes an upper plate having an opening and side plates extending downward from the upper plate, and the side plate of the first cover includes a first groove formed at a position corresponding to the second Hall sensor and second grooves spaced apart from the first groove.

The sensing device may further include a collector coupled to the second cover, wherein the second grooves may be disposed close to side surface ends of the collector.

The second grooves may include a second-first groove and a second-second groove, and the second-first groove and the second-second groove may be disposed close to both side ends of the collector.

A size of the second groove may be 0.2 to 0.5 times a size of the first groove.

A width of the second-second groove in a circumferential direction may be 1.5 times to 2.5 times a width of the second-first groove in the circumferential direction.

The second-first groove may be disposed to be closer to the first groove than the second-second groove.

The second-first groove may be disposed inside one side end of the collector in a circumferential direction, and the second-second groove may be disposed outside the one side end of the collector in the circumferential direction. Accordingly, the second-first groove may be disposed to overlap the collector in a radial direction, and the second-second groove may be disposed to not overlap the collector in the radial direction.

The second grooves may be provided as two second grooves, and an angle between the two second grooves may be 80° to 120° in a circumferential direction of the first cover.

The second grooves may be provided as two grooves, and the collector may be disposed between the two grooves in a circumferential direction of the first cover.

The first Hall sensor may be disposed between two virtual reference lines connecting a center of the first cover and both ends of the collector in a circumferential direction of the first cover.

The side plate may include an outer side plate disposed outside the upper plate and an inner side plate disposed inside the upper plate, and the first groove and the second grooves may be disposed in the outer side plate.

The second-first groove and the second-second groove may be symmetrically disposed with respect to the collector.

Another aspect of the present invention provides a housing, a stator disposed in the housing, a rotor disposed inside the stator, a magnet seating part rotated in conjunction with rotation of the stator, a circuit board disposed in the housing, a first Hall sensor and a second Hall sensor disposed on the circuit board, and a case disposed at one side of the housing, wherein a first protrusion of the case is coupled to a hole formed in the housing.

In this case, the housing may include a first housing and a second housing disposed to face each other, the first housing may include a first housing body and a protruding portion formed on a side surface of the first housing body, and the hole may be formed in the protruding portion.

In addition, the case may include an upper plate and an outer side plate extending from the upper plate in an axial direction, wherein the first protrusion may be formed to protrude from an outer circumferential surface of the outer side plate in the axial direction.

A length (L1) of the first protrusion may be greater than the sum of a length (L2) of the protruding portion in the axial direction and a length (L3) of the protruding portion in a radial direction on the basis of an end portion of the outer side plate.

An end portion of the first protrusion passing through the hole may be bent outward and may be in contact with a lower surface of the protruding portion.

The end portion of the first protrusion in contact with the lower surface of the protruding portion may be bent in the axial direction and may be in contact with a side surface of the protruding portion.

The second Hall sensor may be disposed to face the first groove.

The magnet seating part may include a magnet seating part body, a second magnet disposed on the magnet seating part body, and a second protrusion protruding from an inner circumferential surface of the magnet seating part body in a radial direction, and the second protrusion may be coupled to a third groove formed in a holder of the stator.

The second magnet may be disposed to periodically face the second Hall sensor through the first groove as the magnet seating part rotates.

The case may further include an inner side plate extending from an inner circumferential surface of the upper plate in the axial direction.

The case may further include second grooves formed in the outer side plate to be spaced apart from the first groove.

In this case, the second grooves may include a second-first groove and a second-second groove, and the second-first groove and the second-second groove may be disposed close to both side ends of a collector disposed in the first housing.

Meanwhile, the case may be formed of a metal material, and the housing may be formed of a synthetic resin material.

Advantageous Effects

According to embodiments, there is an advantageous effect in that magnetic field interference is reduced even when a ferromagnetic substance is used for a cover.

In a sensing device according to the embodiment, a case and a housing can be stably assembled without an additional component.

In the sensing device, the case is assembled at a predetermined position on the housing using a coupling structure between a first protrusion of the case and a hole of the housing.

In addition, since the case is formed of a metal material, the magnetic field interference can be prevented.

In addition, in the sensing device, since the first protrusion of the case is bent after being coupled to the hole, the case is prevented from being separated from the housing.

Useful advantages and effects of the embodiments are not limited to the above-described contents and will be more easily understood from descriptions of the specific embodiments.

DESCRIPTION OF DRAWINGS

FIG. 1 is a view illustrating a sensing device according to a first embodiment.

FIG. 2 is an exploded view illustrating the sensing device illustrated in FIG. 1.

FIG. 3 is a side view illustrating a circuit board illustrated in FIG. 2.

FIG. 4 is a side view illustrating a seating part illustrated in FIG. 2.

FIG. 5 is a view illustrating a second-second cover of FIG. 2.

FIG. 6 is a view illustrating the seating part.

FIG. 7 is a perspective view illustrating a first cover.

FIG. 8 is a bottom view illustrating a second cover illustrated in FIG. 7.

FIG. 9 is a view illustrating a collector disposed on the second cover.

FIG. 10 is a graph showing output torque change amounts at both side surface ends of the collector.

FIG. 11 is a view illustrating the first cover including a second groove disposed close to the collector, FIG. 12 is a view illustrating positions of the collector and a first Hall sensor, FIG. 13 is a cross-sectional view taken along line A-A of FIG. 8 and illustrates a flow of a flux guided by an inner side plate of the first cover.

FIG. 14 is a comparison graph between an output torque change amount of the sensing device according to the first embodiment and an output torque change amount of a sensing device according to a comparative example.

FIG. 15 is a perspective view illustrating a sensing device according to a second embodiment.

FIG. 16 is an exploded perspective view illustrating the sensing device according to the second embodiment.

FIG. 17 is a perspective view illustrating a first housing of the sensing device according to the second embodiment.

FIG. 18 is a plan view illustrating the first housing of the sensing device according to the second embodiment.

FIG. 19 is a bottom view illustrating the first housing of the sensing device according to the second embodiment.

FIG. 20 is a side view illustrating the first housing of the sensing device according to the second embodiment.

FIG. 21 is a perspective view illustrating a case of the sensing device according to the second embodiment.

FIG. 22 is a bottom perspective view illustrating the case of the sensing device according to the second embodiment.

FIG. 23 is a bottom view illustrating the case of the sensing device according to the second embodiment.

FIG. 24 is a side view illustrating the case of the sensing device according to the second embodiment.

FIG. 25 is a cross-sectional view illustrating the case of the sensing device according to the second embodiment.

FIG. 26 is a view illustrating an arrangement relationship between the case and a collector disposed on the first housing of the sensing device according to the second embodiment.

FIG. 27 is a graph showing output torque change amounts detected through a collector of the sensing device according to the comparative example.

FIG. 28 is a graph showing output torque change amounts detected through the collector of the sensing device according to the second embodiment.

FIG. 29 is a view illustrating a flow of a flux guided by an inner side plate of the sensing device according to the second embodiment.

FIG. 30 is a view illustrating a coupled state of a hole of the first housing and a first protrusion of the case of the sensing device according to the second embodiment.

FIG. 31 is a view illustrating a state in which an end portion of the first protrusion is bent after the hole of the first housing is coupled to the first protrusion of the case of the sensing device according to the second embodiment.

FIG. 32 is a side view illustrating a first Hall sensor and a second Hall sensor disposed on a circuit board of the sensing device according to the second embodiment.

FIG. 33 is a perspective view illustrating a magnet seating member of the sensing device according to the second embodiment.

FIG. 34 is a side view illustrating the magnet seating member of the sensing device according to the second embodiment.

FIG. 35 is a view illustrating an arrangement of a second magnet and the second Hall sensor of the sensing device according to the second embodiment.

MODES OF THE INVENTION

Hereinafter, exemplary embodiments of the present invention will be described in detail with reference to the accompanying drawings.

However, the technical spirit of the present invention is not limited to some embodiments which will be described and may be realized using various other embodiments, and at least one component of the embodiments may be selectively coupled, substituted, and used to realize the technical spirit within the range of the technical spirit.

In addition, unless clearly and specifically defined otherwise, all terms (including technical and scientific terms) used herein can be interpreted as having customary meanings to those skilled in the art, and meanings of generally used terms, such as those defined in commonly used dictionaries, will be interpreted by considering contextual meanings of the related technology.

In addition, the terms used in the embodiments of the present invention are considered in a descriptive sense and not to limit the present invention.

In the present specification, unless clearly indicated otherwise by the context, singular forms include the plural forms thereof, and in a case in which "at least one (or one or more) among A, B, and C" is described, this may include at least one combination among all combinations which can be combined with A, B, and C.

In addition, in descriptions of components of the present invention, terms such as "first," "second," "A," "B," "(a)," and "(b)" can be used.

The terms are only to distinguish one element from another element, and an essence, order, and the like of the element are not limited by the terms.

In addition, it should be understood that, when an element is referred to as being "connected or coupled" to another element, such a description may include both a case in which the element is directly connected or coupled to another element and a case in which the element is connected or coupled to another element with still another element disposed therebetween.

In addition, in a case in which any one element is described as being formed or disposed "on or under" another element, such a description includes both a case in which the two elements are formed or disposed in direct contact with each other and a case in which one or more other elements are interposed between the two elements. In addition, when one element is described as being disposed "on or under" another element, such a description may include a case in which the one element is disposed at an upper side or a lower side with respect to another element.

Hereinafter, example embodiments of the invention will be described in detail with reference to the accompanying drawings. Components that are the same or correspond to each other will be denoted by the same reference numerals regardless of the figure numbers, and redundant descriptions will be omitted.

FIG. 1 is a view illustrating a sensing device according to a first embodiment, and FIG. 2 is an exploded view illustrating the sensing device illustrated in FIG. 1.

Referring to FIGS. 1 and 2, a sensing device 10 may include a first cover 100, a second cover 200, a rotor 300, a first magnet 400, a stator 500, a seating part 600, a second magnet 700, a circuit board 800, a first Hall sensor 900, and a second Hall sensor 1000.

The first cover 100 is coupled to the second cover 200. The first cover 100 covers the seating part 600. The first cover 100 is formed of a metal material. This is to guide a flux generated by the second magnet 700 toward the first cover 100. Due to the first cover 100, the flux generated by the second magnet 700 is restricted from flowing toward the first magnet 400. Accordingly, an additional shield does not need to be installed to prevent magnetic field interference. The first cover 100 includes an opening 111 in a central portion thereof.

The second cover 200 may include a second-first cover 210 and a second-second cover 220. The second-first cover 210 and the second-second cover 220 are disposed to face each other. An accommodation space is provided between the second-first cover 210 and the second-second cover 220, and the accommodation space of the second cover 200 accommodates the stator 500. The circuit board 800 is positioned between the second-first cover 210 and the second-second cover 220. The second-first cover 210 may include a first hole 211 through which the rotor 300 passes. In addition, the second-second cover 220 may include a second hole 221 through which the stator 500 passes.

The rotor 300 is positioned inside the stator 500. In addition, the rotor 300 is disposed inside the second cover 200. The rotor 300 is connected to an input shaft of a steering shaft, and in this case, the input shaft may be a steering shaft connected to a handle of a vehicle.

The first magnet 400 is positioned outside the rotor 300 and inside the second cover 200. The first magnet 400 may be fixedly attached to or press-fitted to an outer circumferential surface of the rotor 300.

The stator 500 is disposed outside the rotor 300. The stator 500 may include stator rings 510, a mold member 520, and a holder 530. A pair of stator rings 510 are disposed to face each other. In addition, the pair of stator rings 510 may be fixed to an upper side and a lower side of the mold member 520. The holder 530 is coupled to the mold member 520. The holder 530 may be connected to an output shaft of the steering shaft. In this case, the output shaft may be a steering shaft connected to a power transmission structure of a side of a wheel. The stator 500 is connected to the output shaft and rotated with the output shaft. Meanwhile, the stator 500 includes collectors 540 (see FIG. 9). The collector 540 collects an amount of magnetization of the stator 500.

The seating part 600 is positioned inside the first cover 100. In addition, the seating part 600 is positioned outside the rotor 300. The seating part 600 may be coupled to the second-second cover 220. The seating part 600 is an annular member. The seating part 600 includes a hole at a center thereof. The stator 500 passes through the hole.

The second magnet 700 is installed on the seating part 600. The second magnet 700 may be fixedly insert-molded or attached to the seating part 600. In a case in which the output shaft rotates, the second magnet 700 is rotated with the seating part 600. Accordingly, the second magnet 700 periodically repeats a state of moving toward and moving away from the second Hall sensor 1000 as the output shaft rotates.

FIG. 3 is a side view illustrating the circuit board illustrated in FIG. 2.

As illustrated in FIGS. 2 and 3, the first Hall sensor 900 and the second Hall sensor 1000 are disposed on the circuit board 800.

The circuit board 800 includes a first surface 810 and a second surface 820. The first surface 810 faces the second-first cover 210. The second surface 820 faces the second-second cover 220. The first Hall sensor 900 may be disposed on the first surface 810. The second Hall sensor 1000 may be disposed on the second surface 820.

The first Hall sensor 900 detects an amount of magnetization of the stator 500 generated due to an electrical interaction between the first magnet 400 of the rotor 300 and the stator 500. The first Hall sensor 900 is disposed on the circuit board 800. In addition, the first Hall sensor 900 is positioned between two collectors 540 (see FIG. 9). The first Hall sensor 900 detects an amount of magnetization magnetized due to an interaction between the stator ring 510 and the first magnet 400.

The rotor 300, the stator 500, and the first Hall sensor 900 are components to measure a torque. Torsion occurs at a torsion bar disposed between the input shaft and the output shaft due to a difference in amount of rotation between the input shaft and the output shaft, and when the torsion occurs, an amount of rotation of the first magnet 400 of the rotor 300 is different from an amount of rotation of the stator 500. Accordingly, facing surfaces of the first magnet 400 and the stator ring 510 are changed so that an amount of magnetization is changed. A torque applied to the steering shaft may be measured based on an amount of magnetization detected by the first Hall sensor 900.

The second Hall sensor 1000 periodically outputs a detection signal every 360° whenever moving close to the second magnet 700 disposed on the seating part 600. An angular acceleration of the output shaft may be calculated based on the detection signal output by the second Hall sensor 1000.

FIG. 4 is a side view illustrating the seating part illustrated in FIG. 2.

Referring to FIG. 4, the seating part 600 includes a first surface 610 and a second surface 620. The first surface 610 faces the second cover 200 in an axial direction C. The second surface 620 faces the first cover 100. The second magnet 700 may be disposed on the second surface 620 to face the second cover 200. The seating part 600 is coupled to the holder 530 of the stator 500 to be rotated with the stator 500 when the output shaft rotates.

FIG. 5 is a view illustrating the second-second cover of FIG. 2.

A Hall sensor housing 222 protrudes from an outer surface of the second-second cover 220. The Hall sensor housing 222 is disposed close to an accommodation portion 223. The second Hall sensor 1000 is disposed in the Hall sensor housing 222, and the Hall sensor housing 222 fixes a position of the second Hall sensor 1000. The accommodation portion 223 may be disposed on the outer surface of the second-second cover 220 to have a concave shape around the second hole 221. The accommodation portion 223 is a portion accommodating the seating part 600.

Meanwhile, the second-second cover 220 may include coupling parts 224. The coupling parts 224 are coupled to the second cover 200. The plurality of coupling parts 224 may be disposed along a circumference of the accommodation portion 223. The coupling parts 224 may be protrusions for coupling. In addition, coupling parts 225 may be provided on a circumference of the second-second cover 220 to be coupled to the second-first cover 210.

FIG. 6 is a view illustrating the seating part.

Referring to FIG. 6, the seating part 600 may include protrusions 630 for coupling. The protrusions 630 protrude from an inner circumferential surface of the seating part 600. When the seating part 600 is coupled to the mold member 520 of the stator 500, the protrusions 630 may be coupled to the mold member 520 in a direction perpendicular to the axial direction. In this case, a coupling structure coupled to the protrusions 630 may be formed on an outer circumferential surface of the mold member 520. Due to the protrusions 630, a thickness of the sensing device is decreased. This is because the protrusions 630 are coupled to the mold member 520 in the direction perpendicular to the axial direction of a rotating shaft when the seating part 600 is coupled to the mold member 520 of the stator 500. The protrusions 630 do not affect determining a thickness of the sensing device in the axial direction. When the seating part 600 and the mold member 520 have coupling structures to be coupled to each other in the axial direction, the thickness is inevitably increased, but the sensing device according to the first embodiment does not include a coupling space required in the axial direction, and thus there is an advantage of decreasing the thickness of the sensing device.

FIG. 7 is a perspective view illustrating the first cover, and FIG. 8 is a bottom view illustrating the second cover illustrated in FIG. 7.

Referring to FIGS. 7 and 8, the first cover 100 may include an upper plate 110 and side plates 120 and 150. The upper plate 110 has a disc shape, and an opening 111 through which the holder 530 of the stator 500 passes is disposed at a center of the upper plate 110. The side plates 120 and 150 are disposed along circumferences of the upper plate 110 and extend downward from the upper plate 110. The side plates 120 and 150 are divided into an outer side plate 120 and an inner side plate 150. The outer side plate 120 is disposed between the seating part 600 and the Hall sensor housing 222. That is, the outer side plate 120 is disposed outside the seating part 600 and disposed inside the Hall sensor housing 222. A plurality of coupling flanges 101 are disposed along a circumference of the outer side plate 120. The coupling flanges 101 are to be coupled to the second-second cover 220.

A first groove 130 and second grooves 140 are formed in the outer side plate 120. The first groove 130 is aligned with the second Hall sensor 1000 in a circumferential direction of the first cover 100.

The first groove 130 has a shape in which a part of the outer side plate 120 is cut. An outer space and an inner space of the outer side plate 120 communicate with each other through the first groove 130. When the first cover 100 is coupled to the second cover 200, the first groove 130 is aligned with the Hall sensor housing 222 in a rotating direction. The outer side plate 120 blocks the second magnet 700 from the second Hall sensor 1000 such that the second magnet 700 is positioned to face the second Hall sensor 1000 at the position of the second Hall sensor 1000 through the first groove 130. When the output shaft rotates, the second magnet 700 is rotated with the output shaft. As the second magnet 700 is rotated, the second magnet 700 periodically moves close to or away from the second Hall sensor 1000. Accordingly, the second Hall sensor 1000 may periodically generate a detection signal every 360°.

Two second grooves 140 may be disposed. The second groove 140 also has a shape in which a part of the outer side plate 120 is cut. The second groove 140 is positioned to be space apart from the first groove 130.

FIG. 9 is a view illustrating the collector disposed on the second cover, FIG. 10 is a graph showing output torque change amounts at the both side surface ends of the collector, and FIG. 11 is a view illustrating the first cover including the second groove disposed close to the collector, Referring to FIG. 9, the collector 540 may be installed on the second-second cover 220.

FIG. 10 shows output torque change amounts detected by the collector 540. A wave form A illustrated in FIG. 10 shows output torque change amounts when the second magnet 700 passes by the collector 540 in a case in which a cover is present. In addition, a wave form B illustrated in FIG. 10 shows output torque change amounts when the second magnet 700 passes by the collector 540 in a case in which the cover is not present. In this case, the cover is a component corresponding to the first cover 100 of the embodiment, includes a side plate which blocks the second magnet 700 from the second Hall sensor 1000 like the first cover 100 of the embodiment and is a member of which a side plate includes a groove aligned with the second Hall sensor 1000 like the first groove 130.

In the case in which the cover is present, when the second magnet 700 passes by the collector 540, the output torque change amount is affected in a plus (+) direction at positions of the both side surface ends of the collector 540 like the wave form A illustrated in FIG. 10. This is because magnetic field interference greatly affects the output torque change amount at the positions of the both side surface ends of the collector 540 due to the cover.

However, in the case in which the cover is not present, when the second magnet 700 passes by the collector 540, the output torque change amount is affected in a minus (−) direction at the positions of the both side surface ends of the collector 540.

Accordingly, in a state in which the cover is disposed, the output torque change amount may be improved only at positions, like positions O1 and O2 of FIG. 10, to which the magnetic field interference of the cover has been greatly applied in a case in which the cover is removed.

Referring to FIG. 11, two second grooves 140 are positioned close to both side surface ends 541 of the collector 540. Sizes of the second grooves 140 may be less than a size of the first groove 130. For example, widths C2 and C3 of the second grooves 140 may be less than a width C1 of the first groove 130 in the rotating direction. The sizes of the second grooves 140 may range from 0.2 times to 0.5 times the size of the first groove 130. For example, the widths C2 and C3 of the second grooves 140 may range from 0.2 times to 0.5 times the width C1 of the first groove 130 in the rotating direction.

The second grooves 140 are divided into a second-first groove 141 and a second-second groove 142. The second-first groove 141 and the second-second groove 142 may be symmetrically disposed with respect to a reference line L passing through a center of a width of the collector 540 in the circumferential direction of the first cover 100 and a center of the first cover 100.

However, positions of the second-first groove 141 and the second-second groove 142 may be asymmetrical with respect to the reference line L, or a size of the second-first groove 141 may be different from a size of the second-second groove 142 in consideration of a position of the first groove 130 and positions of the coupling flanges 101 which are disposed on the first cover 100. Particularly, a size of any one, which is disposed closer to the first groove 130, of the second-first groove 141 and the second-second groove 142 may be less than the size of the other. For example, the first groove 130 and the second-first groove 141 are disposed at a left side of the collector 540 in the first cover 100. In this case, since the first groove 130 is close to the end of the collector 540, magnetic field interference may also be reduced due to the first groove 130 at the left side of the collector 540 unlike a right side, at which only the second-second groove 142 is disposed, of the collector 540. Accordingly, the size of the second-first groove 141 may be less than the size of the second-second groove 142. In addition, this is because spatial restriction of the second-first groove 141 due to the first groove 130 is considered. In addition, in a case in which the position of the coupling flange 101 is close to the end 541 of the collector 540, the size of the second-first groove 141 may be set to be less than the size of the second-second groove 142 in consideration of the position of the coupling flange 101. For example, the width C2 of the second-first groove 141 may be less than the width C3 of the second-second groove 142 in the rotating direction. The width C3 of the second-second groove 142 may be 1.5 times to 2.5 times the width C2 of the second-first groove 141.

An angle R1 between two second grooves 140 may range from 80° to 120° in the circumferential direction of the first cover 100. In addition, an angle R2 between both ends 541 of the collector 540 may range from 90° to 110° in the circumferential direction of the first cover 100. When the position of the first groove 130 and the position of the coupling flange 101 are considered, the second-first groove 141 may be positioned between both ends 541 of the collector 540 in the circumferential direction of the first cover 100. However, the second-second groove 142 may be disposed outside the end 541 of the collector 540 on the basis of the circumferential direction of the first cover 100.

In addition, the second-first groove 141 may be disposed to be closer to the end 541 of the collector 540 than the second-second groove 142 in the circumferential direction of the first cover 100. Specifically, a distance d1 between the second-first groove 141 and the end 541 of the collector 540 may be less than a distance d2 between the second-second groove 142 and the end 541 of the collector 540 in the circumferential direction of the first cover 100.

FIG. 12 is a view illustrating positions of the collector and the first Hall sensor, Referring to FIG. 12, virtual reference lines connecting a center C of the first cover 100 and the both side surface ends of the collector 540 are referred to as a first reference line B1 and a second reference line B2. The collector 540 may be disposed between the second-first groove 141 and the second-second groove 142 in the circumferential direction of the first cover 100. In addition, the first Hall sensor 900 is disposed in a region P of FIG. 12 corresponding to a region between the first reference line B1 the second reference line B2 in the circumferential direction of the first cover 100.

FIG. 13 is a cross-sectional view taken along line A-A of FIG. 8 and illustrates a flow of a flux guided by the inner side plate of the first cover.

Referring to FIG. 13, the outer side plate 120 is disposed outside the second magnet 700 and the inner side plate 150 is disposed inside the second magnet 700. A height h2 of the inner side plate 150 may be less than a height h1 of the outer side plate 120.

A flux of the second magnet 700 does not flow to the outside of the outer side plate 120 but is guided to the upper plate 110 by the outer side plate 120. The flux guided to the upper plate 110 does not flow to an inside of the inner side plate 150 but flows along the inner side plate 150 and is guided toward the second magnet 700 as illustrated in a region T of FIG. 13. When the inner side plate 150 is not present, the flux guided to the upper plate 110 may leak to an inner side of the second magnet 700. The leakage flux may cause magnetic field interference to occur at a side of the torque sensor. As described above, the inner side plate 150 prevents the flux guided to the upper plate 110 by the outer side plate 120 from leaking to the inner side of the second magnet 700 so that an effect of magnetic field interference is further greatly reduced.

FIG. 14 is a comparison graph between an output torque change amount of the sensing device according to the first embodiment and an output torque change amount of a sensing device according to a comparative example.

Referring to FIG. 14, a wave form C of FIG. 14 shows output torque change amounts of a sensing device according to a comparative example. In addition, a wave form D of FIG. 14 shows output torque change amounts of the sensing device according to the first embodiment. In the case of the comparative example, a cover corresponding to the first cover 100 of the embodiment is included in the sensing device, but the cover is installed such that only a groove aligned with the second Hall sensor 1000 is provided and a groove corresponding to the second groove 140 of the embodiment is not present.

In the case of the embodiment, the output torque change amount is decreased more than the output torque change amount of the comparative example at positions O1 and O2 of FIG. 14. This is because the second grooves 140 affect the output torque change amount in a minus (−) direction at both side ends of the collector 540 to offset an output torque change amount increased in a plus (+) direction. However, in the case of the comparative example, the output torque change amount is greatly increased at the both side ends of the collector 540 due to magnetic field interference of the cover.

FIG. 15 is a perspective view illustrating a sensing device according to a second embodiment, and FIG. 16 is an exploded perspective view illustrating the sensing device according to the second embodiment. In this case, an x-direction refers to an axial direction and a y-direction refers to a radial direction in FIG. 16. In addition, the axial direction is perpendicular to the radial direction.

Referring to FIGS. 15 and 16, a sensing device 1 according to the second embodiment may include a housing 1100, a case 1200 disposed at one side of the housing 1100, a stator 1300 disposed in the housing 1100, a rotor 1400 disposed inside the stator 1300, a circuit board 1500 disposed in the housing 1100, a first Hall sensor 1600 and a second Hall sensor 1700 disposed on the circuit board 1500, collectors 1800, and a magnet seating part 1900. In this case, a protrusion of the case 1200 may be coupled to a hole of the housing 1100. In this case, "inside" may be referred to as a direction toward a center C in the radial direction and "outside" may be referred to as a direction opposite to "inside."

The housing 1100 and the case 1200 may form an exterior of the sensing device 1. In this case, the case 1200 may be referred to as a cover.

The housing 1100 may include a first housing 1110 and a second housing 1120 which are coupled to each other to form an accommodation space therein. In this case, the first housing 1110 and the second housing 1120 may be disposed to face each other.

In addition, the first housing 1110 and the second housing 1120 may be formed of a synthetic resin material such as plastic.

Meanwhile, the stator 1300, the rotor 1400, the circuit board 1500, and the like may be disposed in the accommodation space.

FIG. 17 is a perspective view illustrating the first housing of the sensing device according to the second embodiment, FIG. 18 is a plan view illustrating the first housing of the sensing device according to the second embodiment, FIG. 19 is a bottom view illustrating the first housing of the sensing device according to the second embodiment, and FIG. 20 is a side view illustrating the first housing of the sensing device according to the second embodiment.

Referring to FIGS. 17 to 20, the first housing 1110 may include a first housing body 1111 in which a first through hole 1112 is formed, protruding portions 1113 formed on a side surface 1111*a* of the first housing body 1111, holes 1114 formed in the protruding portions 1113, a Hall sensor housing 1115, an accommodation portion 1116 formed in the first housing body 1111, and coupling parts 1117.

The first through hole 1112 for the stator 1300 connected to an output shaft (not shown) may be formed in the first housing body 1111. In this case, the output shaft may be connected to a side of a steering wheel.

In addition, one of two collectors 1800 may be disposed on the first housing body 1111. As illustrated in FIG. 19, the collector 1800 may be disposed on an inner surface of the first housing body 1111. In this case, the collector 1800 disposed on the first housing body 1111 may be referred to as a first collector.

The protruding portion 1113 may be formed on the side surface 1111*a* of the first housing body 1111. As illustrated in FIG. 17, the protruding portion 1113 may be formed to protrude from one side of the side surface 1111*a* of the first housing body 1111 in the radial direction. In this case, the protruding portion 1113 may be integrally formed with the first housing body 1111.

The hole 1114 may be formed in the protruding portion 1113. In addition, first protrusions 1230 of the case 1200 may be coupled to the holes 1114. Accordingly, the case 1200 may be prevented from moving in a circumferential direction.

Referring to FIG. 20, the protruding portion 1113 may be formed as a structure having a length L2 in the axial direction and a length L3 in the radial direction. Accordingly, the hole 1114 may also be formed to pass through the protruding portion 1113 having the length L2 in the axial direction.

The Hall sensor housing 1115 may be formed to protrude from the first housing body 1111 in the axial direction. In this case, the Hall sensor housing 1115 may be disposed close to the accommodation portion 1116. In addition, the second Hall sensor 1700 disposed on the circuit board 1500 is positioned in the Hall sensor housing 1115.

Accordingly, the Hall sensor housing 1115 serves to fix a position of the second Hall sensor 1700. Then, a slot 1115a accommodating the second Hall sensor 1700 is provided in the Hall sensor housing 1115, and the Hall sensor housing 1115 includes an open surface which is open toward the accommodation portion 1116.

In addition, stoppers 1115b which restrict the second Hall sensor 1700 from being separated from the Hall sensor housing 1115 may protrude at an inlet of the open surface of the Hall sensor housing 1115. As illustrated in FIG. 19, the second Hall sensor 1700 may be disposed on the slot 1115a through an inlet 1115c disposed in a lower surface of the first housing 1110.

The accommodation portion 1116 may be formed on one surface of the first housing body 1111 to have a concave shape. In addition, the accommodation portion 1116 may be disposed around the first through hole 1112. In this case, the magnet seating part 1900 may be disposed in the accommodation portion 1116.

The coupling part 1117 of the first housing 1110 may be formed to be coupled to the second housing 1120. In this case, the coupling part 1117 of the first housing 1110 may be referred to as a first coupling part.

The coupling part 1117 may be formed on the side surface 1111a of the first housing body 1111. As illustrated in FIG. 17, the plurality of coupling parts 1117 may be formed at the other side of the side surface 1111a of the first housing body 1111 in the radial direction. In this case, the coupling part 1117 may be disposed to be spaced apart from the protruding portion 1113 in the axial direction.

Meanwhile, coupling parts may also be formed on the second housing 1120 to face the coupling parts 1117 of the first housing 1110. In addition, the first housing 1110 and the second housing 1120 may be coupled using coupling members 20 passing through the coupling parts 1117 of the first housing 1110 and the coupling parts of the second housing 1120.

Referring to FIG. 16, the second housing 1120 may include a second housing body 1121 in which a second through hole 1122 is formed and coupling parts 1123 formed on a side surface of the second housing body 1121. In this case, the coupling part 1123 may be referred to as a second coupling part.

The second through hole 1122 for the rotor 1400 connected to an input shaft (not shown) may be formed in the second housing body 1121. In this case, the input shaft may be connected to a steering handle.

In addition, the other one of two collectors 1800 may be disposed on the second housing body 1121. As illustrated in FIG. 16, the collector 1800 may be disposed on an inner surface of the second housing body 1121. In this case, the collector 1800 disposed on the second housing body 1121 may be referred to as a second collector.

The plurality of coupling parts 1123 of the second housing 1120 may be formed on the side surface of the second housing body 1121. As illustrated in FIG. 16, the coupling part 1123 may be formed to protrude from the side surface of the second housing body 1121 in the radial direction. In this case, the coupling part 1123 may be formed on the side surface of the second housing body 1121 to correspond to the coupling part 1117 of the first housing 1110.

The case 1200 may be disposed at one side of the housing 1100. In this case, the case 1200 is coupled to one side of the first housing 1110 to cover the magnet seating part 1900.

The case 1200 may be formed of a metal material. This is to guide a flux generated by a magnet disposed on the magnet seating part 1900 to the case 1200. Accordingly, the flux generated by the magnet may be restricted from flowing to a magnet of the rotor 1400 by the case 1200. Accordingly, it is not necessary for an additional shield for preventing magnetic field interference to be installed in the sensing device 1. In this case, the magnet of the rotor 1400 may be referred to as a first magnet 1420, and the magnet disposed on the magnet seating part 1900 may be referred to as a second magnet 1920.

FIG. 21 is a perspective view illustrating a case of the sensing device according to the embodiment, FIG. 22 is a bottom perspective view illustrating the case of the sensing device according to the embodiment, FIG. 23 is a bottom view illustrating the case of the sensing device according to the embodiment, FIG. 24 is a side view illustrating the case of the sensing device according to the embodiment, and FIG. 25 is a cross-sectional view illustrating the case of the sensing device according to the embodiment. In this case, FIG. 25 is a cross-sectional view taken along line A-A of FIG. 21.

Referring to FIGS. 16, and 21 to 25, the case 1200 may include an upper plate 1210, an outer side plate 1220 extending from an outer circumferential surface of the upper plate 1210 in the axial direction, and the first protrusions 1230 formed on the outer side plate 1220. In addition, the case 1200 may further include an inner side plate 1240 extending from an inner circumferential surface of the upper plate 1210 in the axial direction.

The upper plate 1210 has a disc shape, and a through hole 1211 through which a holder 1330 of the stator 1300 passes is disposed at a center of the upper plate 1210. In this case, the through hole 1211 of the upper plate 1210 may be referred to as a third through hole.

The outer side plate 1220 may be disposed along an outer side circumference of the upper plate 1210 and may be formed by bending an outer side edge of the upper plate 1210 downward. For example, the outer side plate 1220 may be formed to have a cylindrical shape.

When the case 1200 is coupled to the first housing 1110, the outer side plate 1220 has a shape bent from the upper plate 1210 and extending in the axial direction. In this case, an inner diameter of the outer side plate 1220 is at least greater than an outer diameter of the magnet seating part 1900. Accordingly, the outer side plate 1220 may be disposed between the magnet seating part 1900 and the Hall sensor housing 1115 in the radial direction.

Accordingly, the outer side plate 1220 may cover a side surface of the second magnet 1920 disposed on the magnet seating part 1900.

Meanwhile, a first groove 1221 may be formed at one side of the outer side plate 1220. As illustrated in FIG. 21, the first groove 1221 may be formed in one region of the outer side plate 1220. As illustrated in FIG. 24, the first groove 1221 may be formed to have a first width W1.

The first groove 1221 is formed by cutting a part of the outer side plate 1220 and has a structure in which an inner side communicates with an outer side of the outer side plate 1220.

When the case 1200 is coupled to the first housing 1110, the first groove 1221 may be aligned with the Hall sensor housing 1115 in the circumferential direction. For example, the first groove 1221 may be disposed to face the Hall sensor housing 1115. Accordingly, the second Hall sensor 1700 disposed in the Hall sensor housing 1115 may be disposed to face the first groove 1221.

Second grooves 1222 may be disposed in the outer side plate 1220 to be spaced apart from the first groove 1221.

The second grooves 1222 are formed by cutting some parts of the outer side plate 1220 and have structures in which the inner side communicates with the outer side of the outer side plate 1220.

As illustrated in FIGS. 21 to 23, two second grooves 1222 may be formed and may include a second-first groove 1223 and a second-second groove 1224 disposed to be spaced apart from each other.

As illustrated in FIG. 24, the second-first groove 1223 may be formed to have a second width W2, and the second-second groove 1224 may be formed to have a third width W3. In this case, the second width W2 of the second-first groove 1223 and the third width W3 of the second-second groove 1224 may be less than a first width W1 of the first groove 1221. For example, the second width W2 of the second-first groove 1223 and the third width W3 of the second-second groove 1224 may range from 0.2 times to 0.5 times the first width W1 of the first groove 1221.

Meanwhile, the second width W2 of the second-first groove 1223 may be less than the third width W3 of the second-second groove 1224. For example, the third width W3 of the second-second groove 1224 may be 1.5 times to 2.5 times the second width W2 of the second-first groove 1223.

FIG. 26 is a view illustrating an arrangement relationship between the case and a collector disposed on the first housing of the sensing device according to the embodiment.

Referring to FIG. 26, an angle θ1 between two grooves which are the second-first groove 1223 and the second-second groove 1224 may range from 80° to 120° in the circumferential direction about the center C of the case 1200.

In addition, an angle θ2 between both ends 1810 of the collector 1800 disposed on the first housing 1110 may range from 90° to 110° in the circumferential direction about the center C of the case 1200.

In this case, the collector 1800 disposed on the first housing 1110 may be disposed between the second-first groove 1223 and the second-second groove 1224 in the circumferential direction about the center C of the case 1200.

When a position of the first groove 1221 and a position of the first protrusion 1230 are considered, the second-first groove 1223 may be disposed inside the both ends 1810 of the collector 1800 on the basis of the circumferential direction of the case 1200. However, the second-second groove 1224 may be disposed outside the end 1810 of the collector 1800 on the basis the circumferential direction of the case 1200.

In addition, the second-first groove 1223 may be disposed to be closer to the end 1810 of the collector 1800 than the second-second groove 1224 in the circumferential direction of the case 1200. Specifically, a distance d1 between the second-first groove 1223 and the end 1810 of the collector 1800 may be less than a distance d2 between the second-second groove 1224 and the end 1810 of the collector 1800 in the circumferential direction of the case 1200.

Meanwhile, as illustrated in FIG. 26, the second-first groove 1223 and the second-second groove 1224 may be symmetrically disposed with respect to a reference line L passing through a center of a width of the collector 1800 and the center C of the case 1200 in the circumferential direction of the case 1200.

FIG. 27 is a graph showing output torque change amounts detected through the collector of the sensing device according to the comparative example, and FIG. 28 is a graph showing output torque change amounts detected through the collector of the sensing device according to the second embodiment.

In this case, a wave form A illustrated in FIG. 27 shows output torque change amounts in a state in which the case 1200 is not present, a wave form B illustrated in FIGS. 27 and 28 shows output torque change amounts due to the case 1200 including only the first groove 1221, and a wave form C illustrated in FIG. 28 shows output torque change amounts due to the case 1200 including the first groove 1221, the second-first groove 1223, and the second-second groove 1224.

In the case of the wave form A, when the second magnet 1920 passes by the collector 1800, the output torque change amount is affected in a minus (−) direction at both side surface ends of the collector 1800.

In the case of the wave form B, when the second magnet 1920 passes by the collector 1800, the output torque change amount is affected in a plus (+) direction at the both side surface ends of the collector 1800. This is because magnetic field interference due to the outer side plate 1220 of the case 1200 greatly affects the output torque change amount at the both side surface ends of the collector 1800.

In a state in which the case 1200 is disposed, the output torque change amount can be improved in a case in which a part of the outer side plate 1220 of the case 1200 is removed at positions (see positions O1 and O2 of FIG. 27) to which the magnetic field interference of the case 1200 has been greatly applied.

That is, the output torque change amount of the sensing device 1 according to the second embodiment can be improved by forming the first groove 1221, the second-first groove 1223, and the second-second groove 1224 in the case 1200 of the sensing device 1.

In the case of the wave form C, the output torque change amount is greatly decreased from the output torque change amount of the wave form B (see positions O1 and O2 of FIG. 28). For example, this is because the output torque change amount is affected in the minus (−) direction by the second-first groove 1223 and the second-second groove 1224 at both side ends of the collector 1800 so that the output torque change amount increased in the plus (+) direction is offset. However, in the case of the wave form B provided as the comparative example, the output torque change amount is greatly increased due to magnetic field interference of the outer side plate 1220 of the case 1200 at the both side ends of the collector 1800.

The first protrusion 1230 may be formed to protrude from an outer circumferential surface of the outer side plate 1220 in the axial direction. As illustrated in FIG. 16, the first protrusion 1230 may protrude toward the first housing 1110. In this case, the plurality of first protrusions 1230 may be disposed on the outer circumferential surface of the outer side plate 1220 to be spaced apart from each other in the circumferential direction.

The first protrusion 1230 is coupled to the hole 1114 of the first housing 1110 to couple the case 1200 and the first housing 1110. Accordingly, the case 1200 is positioned at a preset position on the first housing 1110. In this case, the first protrusion 1230 may be coupled to the hole 1114 using an insertion coupling method. Accordingly, due to the coupling of the hole 1114 and the first protrusion 1230, the case 1200 is prevented from moving in the circumferential direction and in the axial direction.

Referring to FIG. 24, the first protrusion 1230 may be formed to have a predetermined length L1 base on an end portion of the outer side plate 1220. In this case, the length L1 of the first protrusion 1230 may be greater than the sum of a length L2 of the protruding portion 1113 in the axial direction and a length L3 of the protruding portion in the radial direction. In this case, the length L1 of the first protrusion 1230 in the axial direction may be referred to as a first length. In addition, the length L2 of the protruding portion 1113 in the axial direction may be referred to as a second length. In addition, the length L3 of the protruding portion 1113 in the radial direction may be referred to as a third length.

The inner side plate 1240 may be disposed along an inner side circumference of the upper plate 1210 and formed by bending an inner side edge of the upper plate 1210 downward. For example, the inner side plate 1240 may be formed to have a cylindrical shape.

When the case 1200 is coupled to the first housing 1110, the inner side plate 1240 has a shape bent from the upper plate 1210 and extending in the axial direction. In this case, an outer diameter of the inner side plate 1240 is designed to be at least less than an inner diameter of the magnet seating part 1900. Accordingly, the inner side plate 1240 may be disposed inside the magnet seating part 1900 in the radial direction.

Referring to FIG. 25, a height h2 of the inner side plate 1240 may be less than a height h1 of the outer side plate 1220.

FIG. 29 is a view illustrating a flow of a flux guided by the inner side plate of the sensing device according to the second embodiment.

Referring to FIG. 29, a flux of the second magnet 1920 does not flow to an outer side of the outer side plate 1220 but is guided to the upper plate 1210 by the outer side plate 1220.

As illustrated in a region T of FIG. 29, the flux guided to the upper plate 1210 is guided by the inner side plate 1240. For example, the flux guided to the upper plate 1210 does not flow to an inner side of the inner side plate 1240 but flows along the inner side plate 1240 and is guided toward the second magnet 1920.

When the inner side plate 1240 is not present, the flux guided to the upper plate 1210 may leak to the inner side of the second magnet 1920. In addition, the leakage flux may cause magnetic field interference to occur at a side of the first magnet 1420 of the rotor 1400. Accordingly, the inner side plate 1240 prevents the flux guided to the upper plate 1210 by the outer side plate 1220 from leaking to the inner side of the second magnet 1920 to greatly further reduce an effect of the magnetic field interference.

FIGS. 30 and 31 are views illustrating coupling relationship between the hole of the first housing and the first protrusion of the case of the sensing device according to the second embodiment, FIG. 30 is a view illustrating a coupled state of the hole of the first housing and the first protrusion of the case of the sensing device according to the second embodiment, and FIG. 31 is a view illustrating a state in which an end portion of the first protrusion is bent after the hole of the first housing is coupled to the first protrusion of the case of the sensing device according to the second embodiment.

As illustrated in FIG. 30, the first protrusion 1230 may be coupled to the hole 1114. In this case, since the first length L1 of the first protrusion 1230 is greater than the length L2 of the protruding portion 1113 in the axial direction, an end portion of the first protrusion 1230 may be exposed from the protruding portion 1113.

Referring to FIG. 31, the end portion of the first protrusion 1230 passing through the hole 1114 may be bent outward to be in contact with a lower surface 1113a of the protruding portion 1113. In addition, the end portion of the first protrusion 1230 in contact with the lower surface 1113a of the protruding portion 1113 may be bent in the axial direction to be in contact with a side surface 1113b of the protruding portion 1113.

Accordingly, the first protrusion 1230 may include a first region 1231 passing through the hole 1114, a second region 1232 bent from the first region 1231 and extending outward, and a third region 1233 bent from the second region 1232 and extending in the axial direction.

That is, a structure may be formed in which the first protrusion 1230 is coupled to the hole 1114 of the housing 1100 and the end portion of the first protrusion 1230 is bent. Accordingly, an assembly strength between the housing 1100 and the case 1200 can be secured. For example, the end portion of the first protrusion 1230 passing through the hole 1114 surrounds the protruding portion 1113 so that the housing 1100 can be stably coupled to the case 1200.

The stator 1300 is disposed inside the housing 1100. In this case, the stator 1300 is disposed outside the rotor 1400.

Referring to FIG. 16, the stator 1300 may include stator rings 1310, a mold member 1320, and a holder 1330.

A pair of stator rings 1310 may be disposed to be spaced apart from and face each other. In addition, two stator rings 1310 may be fixed to an upper side and a lower side of the mold member 1320. In this case, the collector 1800 may be disposed close to the stator rings 1310 to collect an amount of magnetization of the stator 1300.

The mold member 1320 may be formed of a synthetic resin material.

In addition, as illustrated in FIG. 16, the mold member 1320 may include a third groove 1321 concavely formed at one side of the mold member 1320.

The holder 1330 is coupled to one side of the mold member 1320. The holder 1330 may be connected to the output shaft of a steering shaft. Accordingly, the stator 1300 is connected to the output shaft to be rotated in conjunction with rotation of the output shaft.

The rotor 1400 is disposed inside the stator 1300. In this case, the rotor 1400 is connected to the input shaft of the steering shaft.

The rotor 1400 may include a yoke 1410 having a cylindrical shape, and the first magnet 1420 disposed around the yoke 1410. The input shaft is inserted into the yoke 1410. In addition, the first magnet 1420 may be disposed outside the yoke 1410.

The first magnet 1420 may be fixedly attached to or press-fitted to an outer circumferential surface of the yoke 1410.

The circuit board 1500 is disposed between the first housing 1110 and the second housing 1120. In this case, the circuit board 1500 is disposed between the pair of collectors 1800.

FIG. 32 is a side view illustrating the first Hall sensor and the second Hall sensor disposed on the circuit board of the sensing device according to the second embodiment.

Referring to FIG. 25, the first Hall sensor 1600 and the second Hall sensor 1700 may be disposed on the circuit board 1500.

The circuit board 1500 may include a first surface 1510 disposed to face the second housing 1120 and a second surface 1520 disposed to face the first housing 1110.

The first Hall sensor 1600 may be disposed on the first surface 1510. The second Hall sensor 1700 may be disposed on the second surface 1520.

The first Hall sensor 1600 detects an amount of magnetization of the stator 1300 generated due to an electrical interaction between the first magnet 1420 of the rotor 1400 and the stator 1300. The first Hall sensor 1600 may be disposed on the circuit board 1500. Specifically, the first Hall sensor 1600 is disposed between two collectors 1800 to detect an amount of magnetization magnetized due to an interaction between the stator ring 1310 and the first magnet 1420.

The stator 1300, the rotor 1400, and the first Hall sensor 1600 are components to measure a torque. Due to a difference in amount of rotation between the input shaft and the output shaft, torsion occurs at a torsion bar disposed between the input shaft and the output shaft. When the torsion occurs, an amount of rotation of the first magnet 1420 of the rotor 1400 is different from an amount of rotation of the stator 1300. Accordingly, since facing surfaces of the first magnet 1420 and the stator ring 1310 are changed, a change in amount of magnetization occurs. Accordingly, the first Hall sensor 1600 may detect the change in amount of magnetization to measure a torque applied to the steering shaft.

The second Hall sensor 1700 may periodically output a detection signal every 360° whenever moving close to the second magnet 1920 disposed on the magnet seating part 1900 to calculate an angular acceleration of the output shaft.

The second Hall sensor 1700 is disposed in the Hall sensor housing 1115. In this case, the second Hall sensor 1700 is disposed to face the first groove 1221 of the case 1200.

The collector 1800 collects a flux of a stator assembly. In this case, the collector 1800 may be formed of a metal material and fixed in the housing 1100.

The collector 1800 may be disposed in each of the first housing 1110 and the second housing 1120. As illustrated in FIG. 18, any one of the collectors 1800 may be disposed in the first housing 1110. In addition, as illustrated in FIG. 16, another one of the collectors 1800 may be disposed in the second housing 1120.

FIG. 33 is a perspective view illustrating the magnet seating member of the sensing device according to the second embodiment, and FIG. 34 is a side view illustrating the magnet seating member of the sensing device according to the second embodiment.

The magnet seating part 1900 may be coupled to the holder 1330 of the stator 1300. Accordingly, the magnet seating part 1900 is rotated in conjunction with rotation of the output shaft.

In addition, the magnet seating part 1900 is disposed inside the outer side plate 1220 of the case 1200 in the radial direction.

Referring to FIGS. 16, 33, and 34, the magnet seating part 1900 may include a magnet seating part body 1910, the second magnet 1920 disposed on the magnet seating part body 1910, and a second protrusion 1930 protruding inward from the magnet seating part body 1910.

The magnet seating part body 1910 may be formed to have a ring shape. In this case, a hole in which the holder 1330 of the stator 1300 is disposed may be formed at a center of the magnet seating part body 1910.

The magnet seating part body 1910 may include a first surface 1911 disposed to face the first housing 1110 and a second surface 1912 disposed to face the second housing 1120 in the axial direction. In this case, the second magnet 1920 may be disposed on the first surface 1911.

The second magnet 1920 may be insert-molded or fixedly attached to the magnet seating part body 1910.

In a case in which the output shaft rotates, the second magnet 1920 is rotated with the magnet seating part body 1910.

The second magnet 1920 repeats a state of moving close to and moving away from the second Hall sensor 1700 as the output shaft rotates. In this case, since the outer side plate 1220 hides the side surface of the second magnet 1920 and the second magnet 1920 is exposed by the first groove 1221, the second magnet 1920 faces the second Hall sensor 1700 through the first groove 1221. Accordingly, the second Hall sensor 1700 may periodically generate a detection signal every 360°.

FIG. 35 is a view illustrating an arrangement of the second magnet and the second Hall sensor of the sensing device according to the second embodiment.

Referring to FIG. 35, the second magnet 1920 may include a first pole 1921 and a second pole 1922. The first pole 1921 may be an N-pole, and the second pole 1922 may be an S-pole. The first pole 1921 may be disposed at a relatively outer side, and the second pole 1922 may be disposed at a relatively inner side. In this case, the first pole 1921 is disposed to face the second Hall sensor 1700.

Referring to FIG. 33, the second protrusion 1930 may be formed to protrude from an inner circumferential surface of the magnet seating part body 1910 in the radial direction. In this case, the second protrusion 1930 may be integrally formed with the magnet seating part body 1910.

When the magnet seating part 1900 is coupled to the stator 1300, the second protrusion 1930 may be coupled to the third groove 1321 of the mold member 1320.

In this case, since the second protrusion 1930 has a structure protruding from the magnet seating part body 1910 in the radial direction and coupled to the third groove 1321 of the mold member 1320 in the axial direction, a thickness of the magnet seating part 1900 can be decreased. Accordingly, a size of the sensing device 1 can be decreased in the axial direction.

When the second protrusion 1930 is a structure protruding in the axial direction and coupled to the third groove 1321 of the mold member 1320, the size of the sensing device 1 is inevitably increased in the axial direction.

That is, since the second protrusion 1930 of the magnet seating part 1900 does not include a coupling space required in the axial direction, there is an advantage of decreasing a thickness of the sensing device 1.

While the present invention has been shown and described with reference to the exemplary embodiments thereof, it will be understood by those skilled in the art that various changes in form and details may be made therein without departing from the spirit and scope of the invention as defined by the appended claims. In addition, it should be understood that differences related to modifications and changes fall within the scope of the present invention defined by the appended claims.

REFERENCE NUMERALS

| | | | |
|---|---|---|---|
| 1, 10: | SENSING DEVICE | 100: | FIRST COVER |
| 130, 1221: | FIRST GROOVE | 140, 1222: | SECOND GROOVE |
| 141: | SECOND-FIRST GROOVE | 200: | SECOND COVER |
| 142: | SECOND-SECOND GROOVE | 400: | FIRST MAGNET |
| 300, 1400: | ROTOR | 540: | COLLECTOR |
| 500, 1300: | STATOR | 700: | SECOND MAGNET |
| 600: | SEATING PART | 900, 1600: | FIRST HALL SENSOR |
| 800: | CIRCUIT BOARD | 1200: | CASE |
| 1000, 1700: | SECOND HALL SENSOR | 1900: | MAGNET SEATING PART |
| 1100: | HOUSING | | |
| 1800: | COLLECTOR | | |

The invention claimed is:

1. A sensing device comprising:
a first cover;
a second cover coupled to the first cover;
a rotor disposed inside the second cover;
a first magnet disposed between the second cover and the rotor;
a stator disposed between the first magnet and the second cover;
a seating part disposed between the first cover and the rotor;
a second magnet disposed on the seating part;
a circuit board disposed on a bottom surface of the second cover; and
a first Hall sensor and a second Hall sensor disposed on the circuit board,
wherein the first cover includes an upper plate having an opening and side plates extending downward from the upper plate, and
the side plate of the first cover includes a first groove formed at a position corresponding to the second Hall sensor and second grooves spaced apart from the first groove.

2. The sensing device of claim 1, further comprising a collector coupled to the second cover,
wherein the second grooves are disposed close to side surface ends of the collector.

3. The sensing device of claim 2, wherein:
the second grooves are provided as two grooves, and
the collector is disposed between the two grooves in a circumferential direction of the first cover.

4. The sensing device of claim 2, wherein the first Hall sensor is disposed between two virtual reference lines connecting a center of the first cover and both ends of the collector in a circumferential direction of the first cover.

5. The sensing device of claim 1, wherein:
the second grooves include a second-first groove and a second-second groove, and
the second-first groove and the second-second groove are disposed close to both side ends of the collector.

6. The sensing device of claim 1, wherein a size of the second groove is 0.2 to 0.5 times a size of the first groove.

7. The sensing device of claim 5, wherein a width of the second-second groove in a circumferential direction is 1.5 times to 2.5 times a width of the second-first groove in the circumferential direction.

8. The sensing device of claim 7, wherein the second-first groove is disposed to be closer to the first groove than the second-second groove.

9. The sensing device of claim 5, wherein the second-first groove and the second-second groove are symmetrically disposed with respect to the collector.

10. The sensing device of claim 5, wherein:
the second-first groove is disposed inside one side end of the collector in a circumferential direction, and
the second-second groove is disposed outside the one side end of the collector in the circumferential direction.

11. The sensing device of claim 1, wherein:
the second grooves are provided as two second grooves, and
an angle between the two second grooves is 80° to 120° in a circumferential direction of the first cover.

12. The sensing device of claim 1, wherein:
the side plate includes an outer side plate disposed outside the upper plate and an inner side plate disposed inside the upper plate, and
the first groove and the second grooves are disposed in the outer side plate.

* * * * *